United States Patent
Kim et al.

(10) Patent No.: US 11,670,068 B2
(45) Date of Patent: *Jun. 6, 2023

(54) APPARATUS AND METHOD FOR PROCESSING IMAGE

(71) Applicant: SAMSUNG ELECTRONICS CO., LTD., Suwon-si (KR)

(72) Inventors: Ye-hoon Kim, Seoul (KR); So-jung Yun, Seoul (KR); Jun-ik Jang, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,930

(22) Filed: Jan. 25, 2021

(65) Prior Publication Data

US 2021/0142090 A1    May 13, 2021

Related U.S. Application Data

(63) Continuation of application No. 15/850,690, filed on Dec. 21, 2017, now Pat. No. 10,902,276.

(30) Foreign Application Priority Data

Dec. 22, 2016  (KR) .................... 10-2016-0176837
Oct. 19, 2017  (KR) .................... 10-2017-0135869

(51) Int. Cl.
*G06V 10/25*     (2022.01)
*H04N 5/232*     (2006.01)
(Continued)

(52) U.S. Cl.
CPC ............. *G06V 10/25* (2022.01); *H04N 23/63* (2023.01); *H04N 23/635* (2023.01); *H04N 23/64* (2023.01); *H04N 23/67* (2023.01)

(58) Field of Classification Search
CPC ............. G06V 10/25; H04N 5/232945; H04N 5/23212; H04N 5/23222; H04N 5/23293
See application file for complete search history.

(56) References Cited

U.S. PATENT DOCUMENTS 8,345,940 B2   1/2013   Mattiuzzi et al.
8,687,844 B2   4/2014   Choe
(Continued)

FOREIGN PATENT DOCUMENTS

CN   101283362 A      10/2008
CN   101635027 A  *   1/2010  ......... G06K 9/00785
(Continued)

OTHER PUBLICATIONS

Non-Final Office Action issued in parent U.S. Appl. No. 15/850,690 dated Aug. 2, 2019.
(Continued)

*Primary Examiner* — Qun Shen
(74) *Attorney, Agent, or Firm* — Sughrue Mion, PLLC

(57) ABSTRACT

An image processing apparatus and an image processing method for estimating a region of interest based on information of interest learned by a data recognition model satisfying a certain condition from among a plurality of data recognition models and for setting a focus are provided. The image processing apparatus includes estimating a region of interest by using a rule-based algorithm or an artificial intelligence (AI) algorithm. When estimating a region of interest by using an AI algorithm, the image processing apparatus may estimate a region of interest by using a machine learning algorithm, a neural network algorithm, or a deep learning algorithm.

15 Claims, 15 Drawing Sheets

(51) Int. Cl.
*H04N 23/63* (2023.01)
*H04N 23/60* (2023.01)
*H04N 23/67* (2023.01)

(56) References Cited

U.S. PATENT DOCUMENTS

| | | | |
|---|---|---|---|
| 8,760,550 B2 | 6/2014 | Koda et al. | |
| 8,780,227 B2 | 7/2014 | Akiyama | |
| 9,253,408 B2 | 2/2016 | Tanaka | |
| 9,344,673 B1 | 5/2016 | Buchheit et al. | |
| 10,070,053 B2 | 9/2018 | Kannermark et al. | |
| 11,113,523 B2 | 9/2021 | Son et al. | |
| 2007/0104472 A1* | 5/2007 | Quan | G06V 10/56 348/E5.045 |
| 2008/0069437 A1* | 3/2008 | Baker | G06K 9/6256 382/159 |
| 2010/0278425 A1 | 11/2010 | Takemoto et al. | |
| 2011/0026837 A1 | 2/2011 | Kita | |
| 2011/0091069 A1 | 4/2011 | Anabuki et al. | |
| 2012/0213409 A1 | 8/2012 | El-Maleh et al. | |
| 2012/0316421 A1 | 12/2012 | Kumar | |
| 2013/0021477 A1 | 1/2013 | Kannermark et al. | |
| 2013/0076943 A1 | 3/2013 | Yoon et al. | |
| 2013/0101157 A1 | 4/2013 | Li et al. | |
| 2014/0365409 A1* | 12/2014 | Burch | E21B 41/0092 706/12 |
| 2015/0063661 A1 | 3/2015 | Lee et al. | |
| 2015/0146925 A1 | 5/2015 | Son et al. | |
| 2016/0140300 A1* | 5/2016 | Purdie | G16H 10/60 705/2 |
| 2016/0284095 A1 | 9/2016 | Chalom et al. | |
| 2016/0342865 A1 | 11/2016 | Tang et al. | |
| 2016/0381282 A1* | 12/2016 | Bandlamudi | H04N 5/23216 348/240.3 |
| 2017/0053167 A1 | 2/2017 | Ren et al. | |
| 2017/0236288 A1* | 8/2017 | Sundaresan | G06T 7/215 382/173 |
| 2017/0337505 A1 | 11/2017 | Chittilappilly et al. | |
| 2018/0330262 A1 | 11/2018 | Motohashi | |
| 2019/0311209 A1* | 10/2019 | Ducote | G06V 20/63 |
| 2022/0036142 A1 | 2/2022 | Wang et al. | |

FOREIGN PATENT DOCUMENTS

| | | |
|---|---|---|
| CN | 102509072 A | 6/2012 |
| CN | 103810503 A | 5/2014 |
| CN | 105184271 A | 12/2015 |
| CN | 105488044 A | 4/2016 |
| JP | 2009-55432 A | 3/2009 |
| JP | 2010-217613 A | 9/2010 |
| JP | 2010-263639 A | 11/2010 |
| JP | 2013-190756 A | 9/2013 |
| KR | 10-2015-0059466 A | 6/2015 |
| KR | 10-1663752 B1 | 10/2016 |

OTHER PUBLICATIONS

Final Office Action issued in parent U.S. Appl. No. 15/850,690 dated Dec. 19, 2019.
Non-Final Office Action issued in parent U.S. Appl. No. 15/850,690 dated Feb. 27, 2020.
Final Office Action issued in parent U.S. Appl. No. 15/850,690 dated Jul. 2, 2020.
Chinese Office Action dated May 28, 2020, issued in Chinese Patent Application No. 201780076454.9.
Notice of Allowance issued in parent U.S. Appl. No. 15/850,690 dated Sep. 21, 2020.
Chinese Office Action dated Oct. 29, 2020, issued in Chinese Patent Application No. 201780076454.9.
Communication dated Sep. 30, 2021 issued by the Korean Intellectual Property Office in Korean Application No. 10-2017-0135869.
Communication dated Feb. 14, 2022, issued by Japanese Patent Office in Japanese Patent Application No. 2019-531622.
Communication dated Aug. 25, 2022, issued by the China National Intellectual Property Administration in Chinese Application No. 202110404412.1.
Second Office Action issued from the China National Intellectual Property Administration dated Mar. 31, 2023 to CN Patent Application No. 202110404412.1.

* cited by examiner

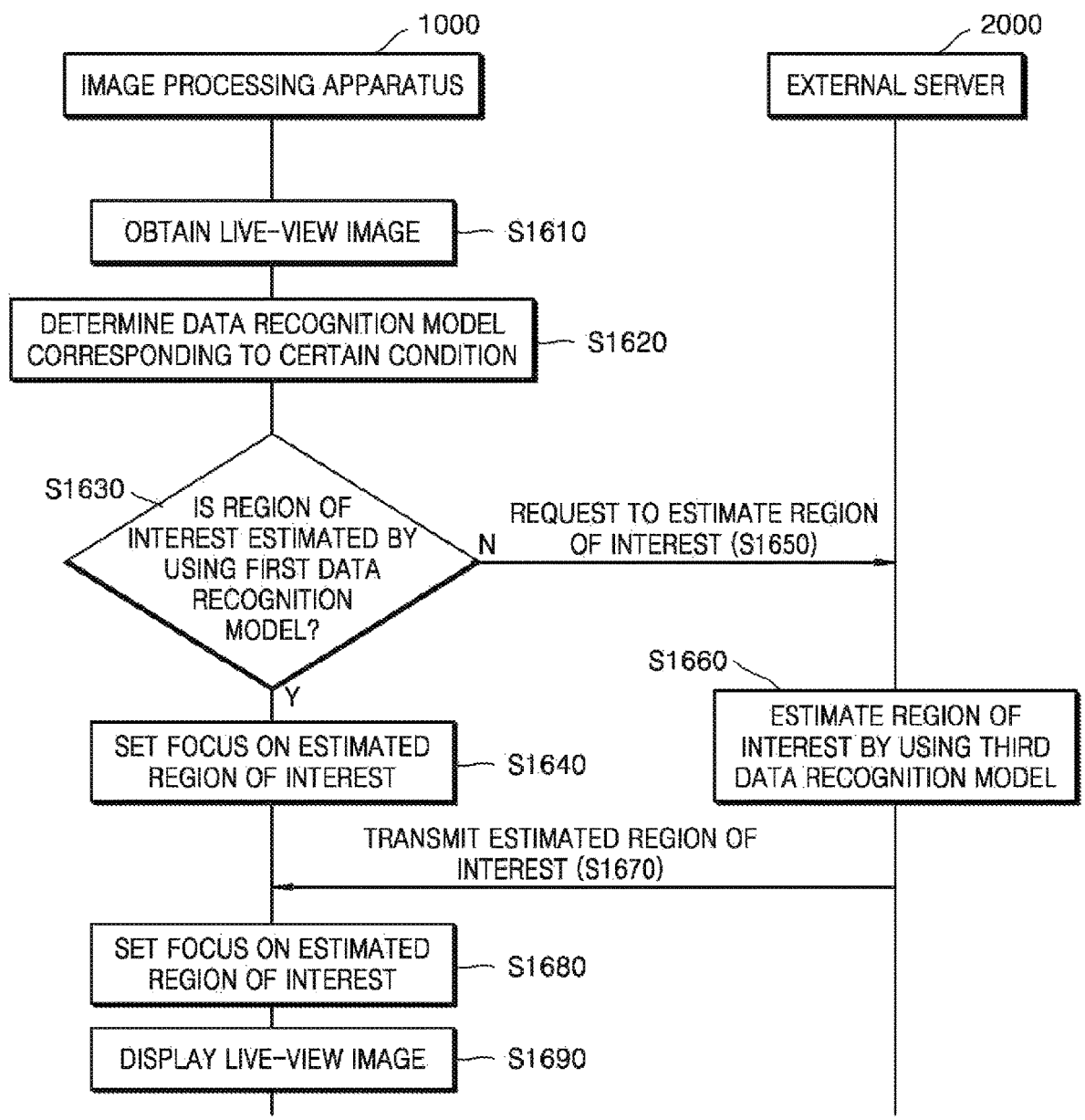

APPARATUS AND METHOD FOR PROCESSING IMAGE

CROSS-REFERENCE TO RELATED APPLICATION(S)

This application is a continuation of U.S. application Ser. No. 15/850,690 filed on Dec. 21, 2017, which claims priority under 35 U.S.C. § 119 to Korean Patent Application No. 10-2016-0176837 filed on Dec. 22, 2016 in the Korean Intellectual Property Office and Korean Patent Application No. 10-2017-0135869 filed on Oct. 19, 2017 in the Korean Intellectual Property Office, the entire disclosures of each of which are incorporated by reference herein in their entireties.

TECHNICAL FIELD

The present disclosure relates to an artificial intelligence (AI) system. More particularly, the present disclosure relates to an AI system for simulating functions of the human brain including recognition and determination by using a machine learning algorithm like deep learning and application technology thereof.

BACKGROUND

In the processing of an image, automatic focus is a task that may increase user satisfaction with the image. Generally, a region of an image in which a user's interest may be concentrated is regarded as a region of interest, and there is an image processing technique for setting a focus on such a region of interest.

Recently, artificial intelligence (AI) systems have also been introduced in the field of image processing.

An AI system is a computer system that implements human-level intelligence and, unlike rule-based smart systems, a machine learns, determines, and becomes intelligent by itself according to the related art. The more an AI system is used, the higher a recognition rate becomes and user preferences are more accurately understood. Therefore, rule-based smart systems are gradually being replaced by deep-learning based AI systems according to the related art.

AI technology includes machine learning (deep learning) and element technologies that utilize the machine learning.

The machine learning is an algorithm technology for autonomously categorizing/learning characteristics of input data. Element technologies are technologies that simulate the functions of the human brain (e.g., recognition and determination) by utilizing machine learning algorithms like deep learning and include linguistic understanding, visual understanding, reasoning/prediction, knowledge representation, motion control, etc.

Various fields in which AI technology is applied are as follows. Linguistic understanding is a technique for recognizing, applying/processing human languages/characters and includes natural language processing, machine translation, dialogue system, query response, speech recognition/synthesis, etc. Visual understanding is a technique for recognizing and processing objects in a manner similar to that of human vision and includes object recognition, object tracking, image searching, human recognition, scene understanding, space understanding, and image enhancement. Reasoning/prediction is a technique to determine information for logical reasoning and prediction and includes knowledge/probability-based reasoning, optimization prediction, preference-based planning, and recommendation. Knowledge representation is a technique for automating human experience information into knowledge data and includes knowledge building (data generation/categorization) and knowledge management (data utilization). Motion control is a technique for controlling autonomous driving of a vehicle and a motion of a robot and includes motion control (navigation, collision avoidance, driving), manipulation control (behavior control), etc.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below Accordingly, an aspect of the present disclosure is to provide an image processing apparatus and an image processing method of setting a focus by estimating a region of interest based on information of interest learned by a data recognition model satisfying a certain condition from among a plurality of data recognition models.

In accordance with an aspect of the present disclosure, an image processing apparatus is provided. The image processing apparatus includes an image capturer configured to obtain a live-view image including at least one object, a memory configured to store computer-executable instructions, at least one processor, which, by executing the computer-executable instructions, based on a data recognition model corresponding to a certain condition from among data recognition models, is configured to estimate a region of interest to a user in the obtained live-view image according to criteria for the data recognition model to determine whether a region corresponds to learned information of interest and set a focus on the estimated region of interest, and an input/output unit configured to display the live-view image in which a focus is set on the estimated region of interest.

In accordance with another aspect of the present disclosure, an image processing method is provided. The image processing method includes obtaining a live-view image including at least one object, based on a data recognition model corresponding to a certain condition from among data recognition models, estimating a region of interest to a user in the obtained live-view image according to criteria for the data recognition model to determine whether a region corresponds to learned information of interest, setting a focus on the estimated region of interest, and displaying the live-view image in which a focus is set on the estimated region of interest.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments will be more apparent from the following description taken in conjunction with the accompanying drawings, in which:

FIG. 16 is a flowchart for describing a case where an image processing apparatus estimates a region of interest by using a server according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of the ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Also, as used herein, terms including ordinals such as "first" or "second" can be used to describe various elements, but the elements should not be limited by the terms. The terms are used only for the purpose of distinguishing one component from another.

In this specification, the term "image processing apparatus" generally refers to an electronic apparatus having an image capturing function. For example, a device such as a smart phone or a digital camera equipped with a camera module may correspond to an image processing apparatus.

Embodiments are related to an image processing apparatus and an image processing method, and detailed descriptions of matters that are widely known to one of ordinary skill in the art to which the embodiments below belong will be omitted.

Figure 1A:
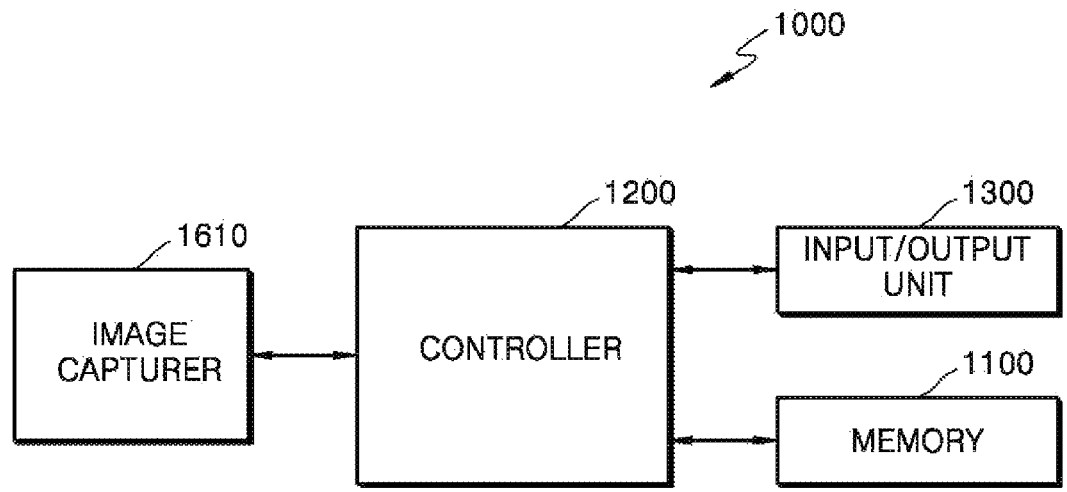
FIG. 1A is a block diagram for describing an image processing apparatus according to an embodiment of the present disclosure.

FIG. 1A is a block diagram for describing an image processing apparatus according to an embodiment of the present disclosure. It will be obvious to one of ordinary skill in the art that general-purpose components other than the components shown in FIGS. 1A and 1B may be further included.

Referring to FIG. 1A, an image processing apparatus 1000 according to an embodiment may include a memory 1100, a controller 1200, an input/output unit 1300, and an image capturer 1610.

The image capturer 1610 may obtain an image including at least one object. For example, the image capturer 1610 may obtain a live-view image including at least one object and may obtain a captured image to be stored in the image processing apparatus 1000 when photographing is actually performed. The image capturer 1610 may capture an image by setting a focus on an estimated region of interest in response to an image capture command from a user. Detailed description of the image capturer 1610 will be given below with reference to FIG. 2.

The memory 1100 may store a program for processing and controlling of the controller 1200 and may also store data input to or output from the image processing apparatus 1000. The memory 1100 may store computer-executable instructions.

The controller 1200 typically controls the overall operation of the image processing apparatus 1000. The controller 1200 may include at least one integrated type processor or a plurality of processors, depending on functions and roles of the controller 1200.

The at least one processor constituting the controller 1200 may execute a computer-executable instruction stored in the memory 1100, thereby, based on a data recognition model corresponding to a certain condition from among data recognition models, estimating a region of interest to a user in an obtained live-view image according to criteria for the data recognition model to determine whether a region corresponds to learned information of interest and setting a focus on the estimated region of interest. Detailed description of the controller 1200 will be given below with reference to FIGS. 3 through 8.

The input/output unit 1300 may display a live-view image focusing on an estimated region of interest. The input/output unit 1300 may display a live-view image reflecting a real-time operation for setting a focus on a region of interest.

Figure 1B:
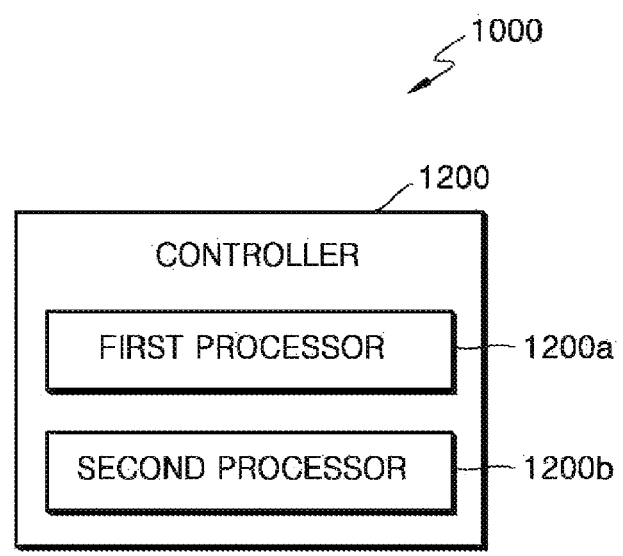
FIG. 1B is a diagram showing configurations of an image processing apparatus according to various embodiments of the present disclosure.

FIG. 1B is a diagram showing configurations of an image processing apparatus according to various embodiments of the present disclosure.

Referring to FIG. 1B, the image processing apparatus 1000 may include the controller 1200 having a first processor 1200a and a second processor 1200b.

The first processor 1200a may control execution of at least one application installed on the image processing apparatus 1000 and perform graphic processing on an image obtained by the image processing apparatus 1000 (e.g., a live view image, a captured image, etc.). The first processor 1200a may be implemented in the form of a central processing unit (CPU), a graphics processing unit (GPU), or a system-on-chip (SoC) in which functions of a communication chip and a sensor are integrated. Furthermore, the first processor 1200a may be described as an application processor (AP) in the present specification.

The second processor 1200b may estimate a region of interest to an image by using a data recognition model.

The second processor 1200b may be fabricated as a dedicated hardware chip for artificial intelligence (AI) that performs a function for estimating a region of interest by using a data recognition model. According to various embodiments, the dedicated hardware chip for AI may include a GPU for the data recognition model including visual understanding as an elemental technology.

The image processing apparatus 1000 may further include a third processor, a fourth processor, and so on that perform(s) the same function as that of the second processor 1200b. In this case, respective processors may perform functions for estimating a region of interest by using different data recognition models.

According to various embodiments of the present disclosure, functions performed by the first processor 1200a may be performed for applications that are stored in the memory 1100 and perform various functions, and functions performed by the second processor 1200b may be performed for an operating system (OS) of the image processing apparatus 1000.

For example, a camera application may generate a live-view image and determine a data recognition model corresponding to a certain condition. The camera application may transmit information related to the determined data recognition model and a request for estimating a region of interest to an OS and/or an external server located outside the image processing apparatus 1000.

The OS and/or the external server may estimate a region of interest by using respective data recognition models included therein. The OS and/or the external servers may set a focus on the estimated region of interest. However, the present disclosure is not limited thereto.

Figure 2:
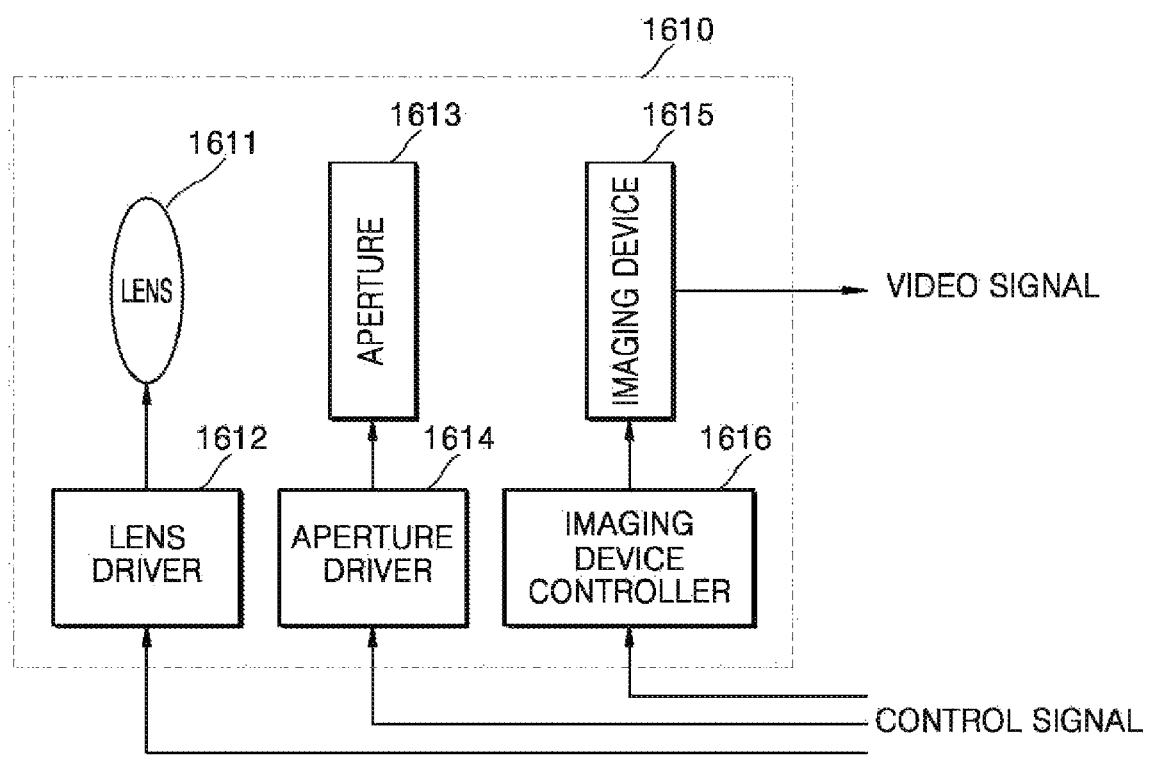
FIG. 2 is a block diagram of an image capturer according to an embodiment of the present disclosure.

FIG. 2 is a block diagram of an image capturer according to an embodiment of the present disclosure. It will be obvious to one of ordinary skill in the art that general-purpose components other than the components shown in FIG. 2 may be further included.

Referring to FIG. 2, the image capturer 1610 is a component for generating an image of electrical signals from incident light and includes a lens 1611, a lens driver 1612, an aperture 1613, an aperture driver 1614, an imaging device 1615, and an imaging device controller 1616.

The lens 1611 may include a plurality of groups of lenses. The position of the lens 1611 is adjusted by the lens driver 1612. The lens driver 1612 adjusts the position of the lens 1611 according to a control signal provided from the controller 1200.

The aperture 1613 is adjusted by the aperture driver 1614 to adjust an amount of light incident on the imaging device 1615.

The optical signal transmitted through the lens 1611 and the aperture 1613 reaches a light receiving surface of the imaging device 1615 and forms an image of an object. The imaging device 1615 may be a charge coupled device (CCD) image sensor or a complementary metal oxide semiconductor (CIS) image sensor for converting an optical signal into an electric signal. Sensitivity of such the imaging device 1615 may be adjusted by the imaging device controller 1616. The imaging device controller 1616 may control the imaging device 1615 according to a control signal automatically generated based on a video signal input in real time or a control signal manually input by a user.

An exposure time of the imaging device 1615 is adjusted by a shutter (not shown). The shutter (not shown) includes a mechanical shutter for moving a screen to adjust incidence of light and an electronic shutter for controlling an exposure by supplying an electrical signal to the imaging device 1615.

An analog signal processor (not shown) may perform noise reduction, gain adjustment, waveform shaping, analog-to-digital conversion, and the like on an analog signal supplied from the imaging device 1615. An image signal output from the analog signal processor (not shown) may be input to the controller 1200. An image signal input to the controller 1200 may become a live-view image through digital signal processing.

Figure 3:
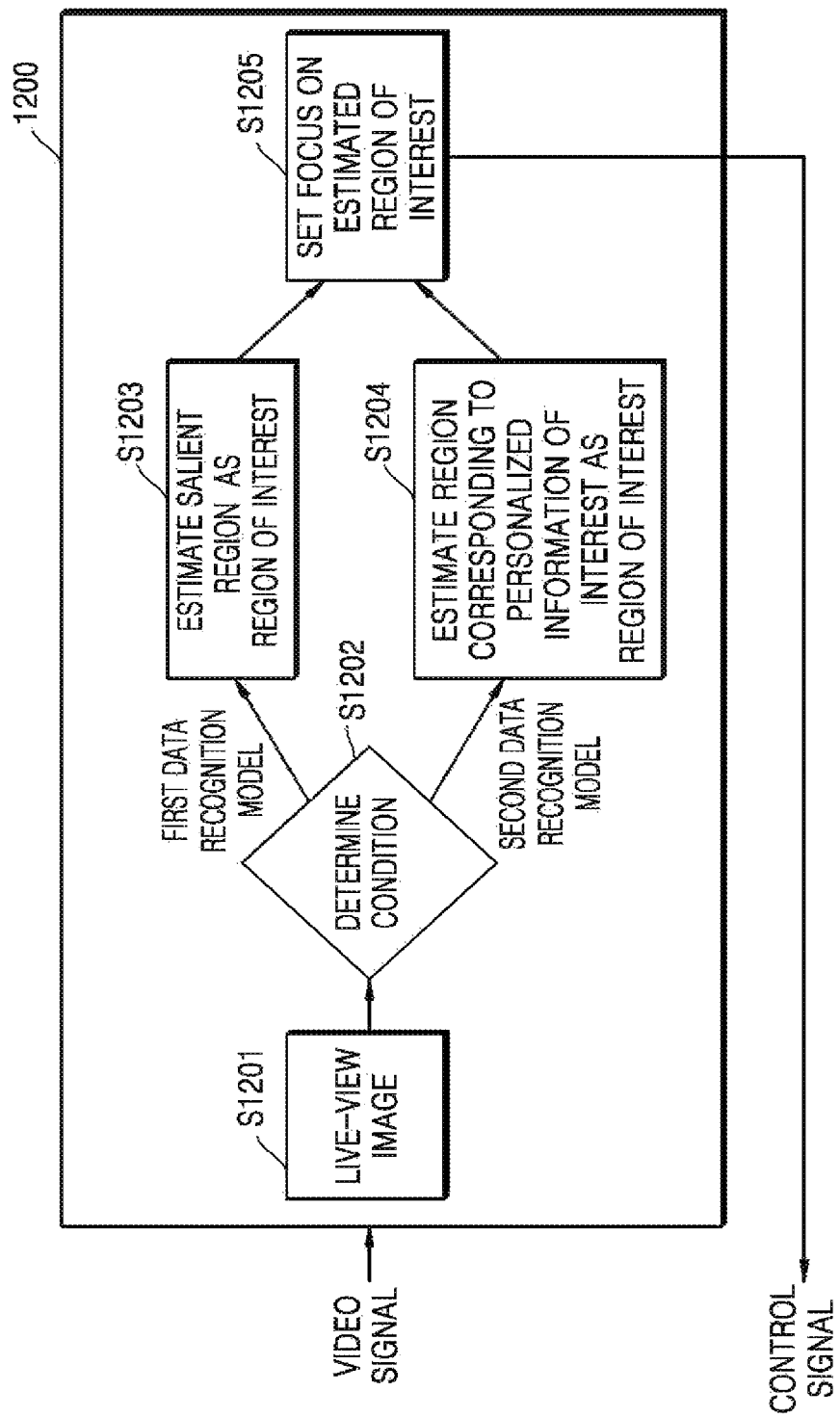
FIG. 3 is a diagram for describing an operation of a controller according to an embodiment of the present disclosure.

FIG. 3 is a diagram for describing an operation of a controller according to an embodiment of the present disclosure.

Referring to FIG. 3, the at least one processor constituting the controller 1200 may obtain a live-view image in operation S1201 based on an image signal input from the image capturer 1610. Based on a data recognition model corresponding to a certain condition from among a plurality of data recognition models, the at least one processor constituting the controller 1200 may in operations S1202, S1203, S1204 estimate a region of interest to a user in an obtained live-view image according to criteria for the data recognition model to determine whether a region corresponds to learned information of interest and in operation 1205 set a focus on the estimated region of interest.

For example, the at least one processor constituting the controller 1200 may determine a salient region as a region of interest to a user according to criteria for a first data recognition model to determine whether a region corresponds to a learned salient region when a first condition is satisfied. A salient region is a region generally recognized as a highlighted region or a unique region in an image and may be determined according to certain criteria regarding areas occupied by objects in an image or color distribution of an image. The first data recognition model may learn criteria for determining whether a region corresponds to a salient region. The first data recognition model may use criteria for determining whether a region corresponds to a learned salient region in case of determining a salient region in a live-view image obtained by an image capturer 1610.

Figure 4A:
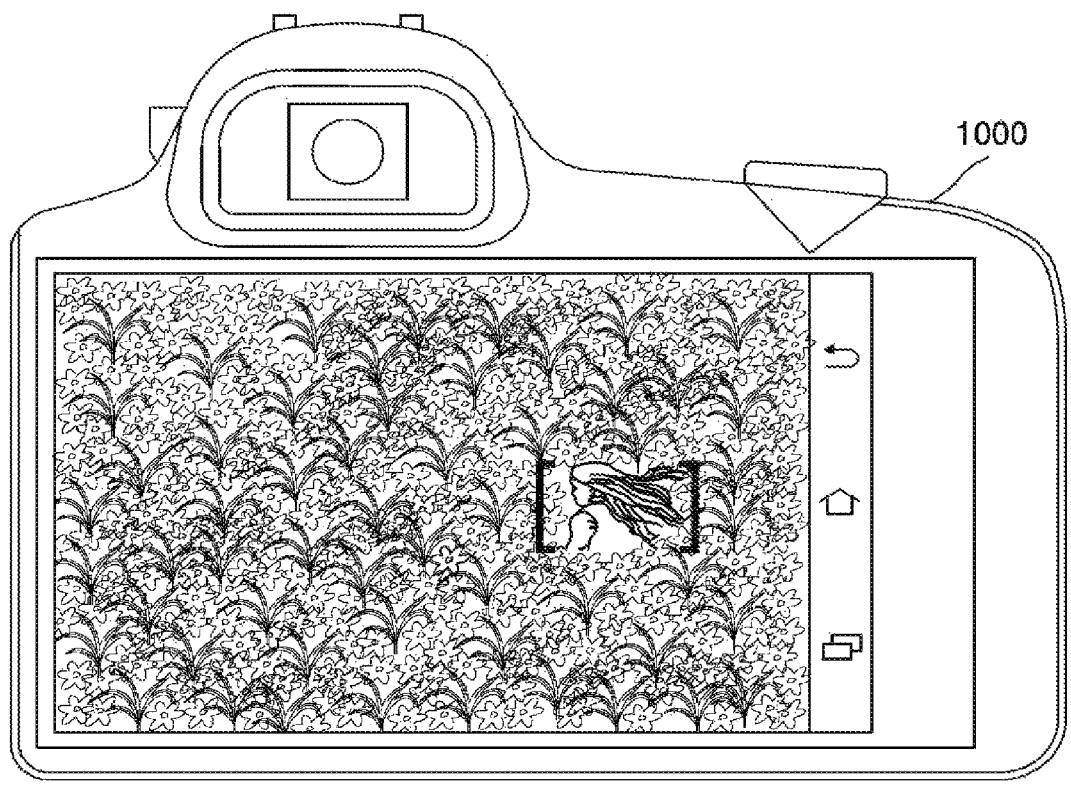
FIGS. 4A and 4B are diagrams for describing an example in which a salient region is estimated as a region of interest and is focused in an image processing apparatus according to an embodiment of the present disclosure.
Figure 4B:
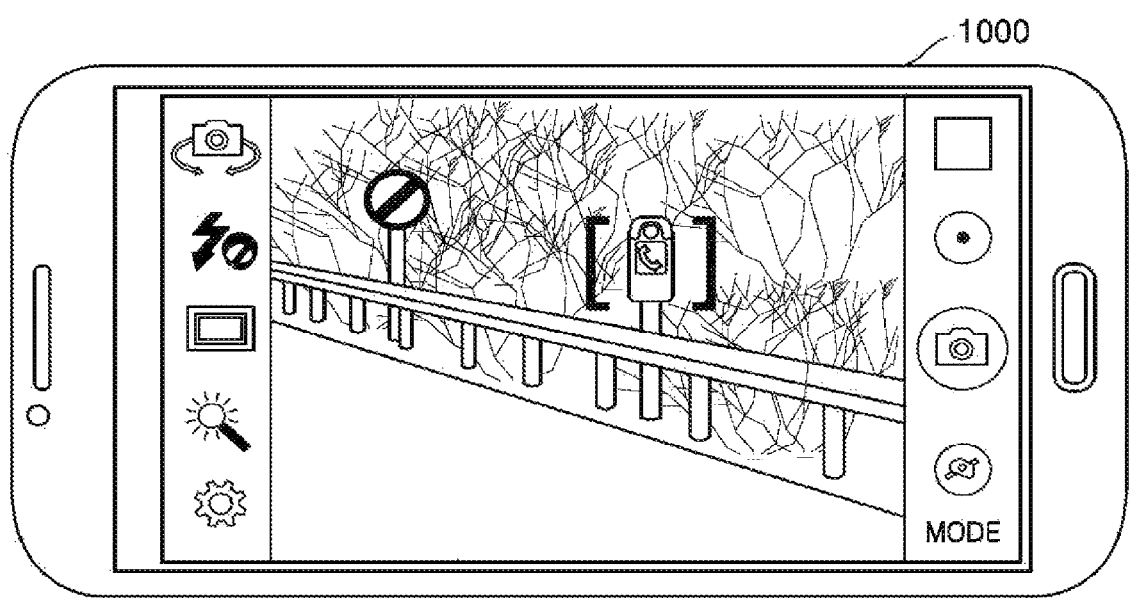

FIGS. 4A and 4B are diagrams for describing an example in which a salient region is estimated as a region of interest and is focused in an image processing apparatus according to an embodiment of the present disclosure.

Referring to FIG. 4A, in the image processing apparatus 1000, a shape or a region corresponding a person passing a single-color flower field of a same type of flowers is remarkably different from that of a region corresponding to the flower field in the background and colors of clothes worn by the person is different from that of the flowers. Therefore, the image processing apparatus 1000 may determine that a region corresponding to the person in the image is a salient region, estimate the region corresponding to the person in the image as a region of interest, and set a focus thereon.

Referring to FIG. 4B, in an image in which a long fence extends between a long road and a forest, the image processing apparatus 1000 may determine that a region corresponding to a red public telephone box in the image is a salient region, estimate the region corresponding to the red public telephone box in the image as a region of interest, and set a focus thereon.

When a second condition is satisfied, the at least one processor constituting the controller 1200 may estimate a region corresponding to personalized information of interest as a region of interest to a user according to criteria for a second data recognition model to determine whether a region corresponds to learned personalized information of interest. The personalized information of interest may be determined based on certain statistics regarding images of the user stored in the image processing apparatus 1000. The second data recognition model may learn about criteria for determining whether a region corresponds to the personalized information of interest. The second data recognition model may use the criteria for determining whether a region corresponds to the learned personalized information of interest when determining a region corresponding to the personalized information of interest in a live-view image obtained by the image capturer 1610.

Figure 5A:
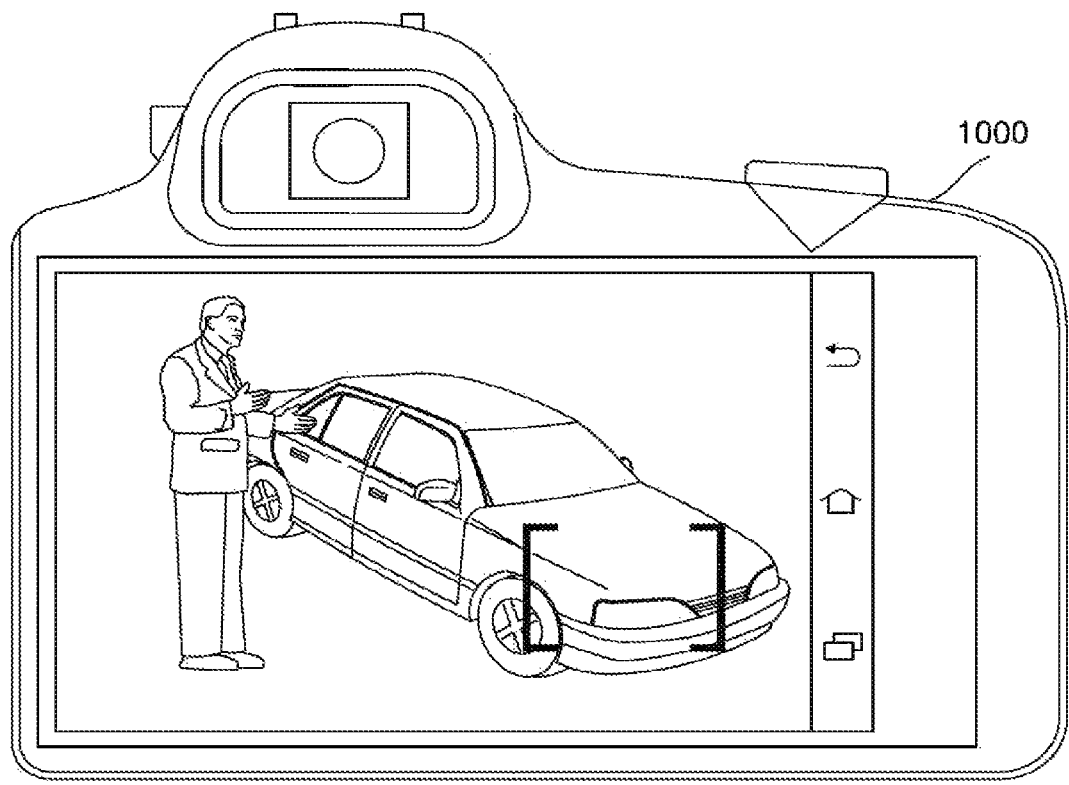
FIGS. 5A and 5B are diagrams for describing an example in which an image processing apparatus estimates a region corresponding to personalized information of interest as a region of interest to a user and set a focus thereon, according to an embodiment of the present disclosure.
Figure 5B:
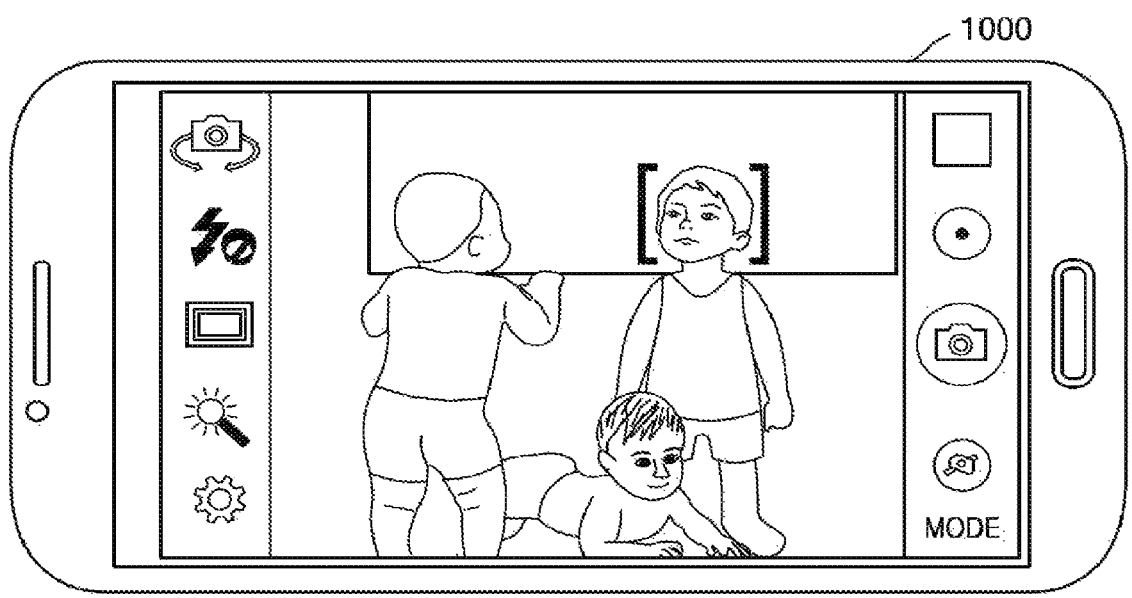

FIGS. 5A and 5B are diagrams for describing an example in which an image processing apparatus estimates a region corresponding to personalized information of interest as a region of interest to a user and set a focus thereon, according to an embodiment of the present disclosure.

Referring to FIG. 5A, in an image including a person and an automobile, when personalized information of interest is the automobile, the image processing apparatus 1000 may estimate a region corresponding to the automobile in the image as a region of interest and set a focus thereon. In other words, in an image including a person and an automobile, it may be common to set a focus on a person. However, when it is determined that personalized information of interest is the automobile, a region corresponding to the automobile may be estimated as a region of interest to a user and a focus may be set thereon.

Referring to FIG. 5B, in an image including several babies, when personalized information of interest is the user's baby, the image processing apparatus 1000 may estimate a region corresponding to the user's baby in the image as a region of interest and set a focus thereon. In other words, in an image including several babies, it may be common to set focuses on all babies or the closest baby. However, when it is determined that the personalized information of interest is the user's baby, the region corresponding to the user's baby may be estimated as a region of interest to the user and a focus may be set thereon.

The second condition refers to a case where the number of images stored in the image processing apparatus 1000 is greater than a certain number and the reliability of personalized information of interest satisfies a certain condition, whereas the first condition refers to a case where the second condition is not satisfied. When the number of images stored in the image processing apparatus 1000 is not greater than the certain number or the reliability of the personalized information of interest does not satisfy the certain condition, it is considered that the second condition is not satisfied. In this case, since accuracy of the personalized information of interest is not satisfactory, the first data recognition model is used to estimate a region of interest.

The at least one processor constituting the controller 1200 may estimate a region corresponding to information of interest having a high priority based on priorities of information of interest as a region of interest to a user.

When a plurality of regions of interest are estimated, the at least one processor constituting the controller 1200 may perform multiple focusing for setting focuses on the plurality of regions of interest. Furthermore, when a plurality of regions of interest are estimated, the at least one processor constituting the controller 1200 may set a focus on a region of interest selected by a user from among the plurality of regions of interest.

The at least one processor constituting the controller 1200 may transmit a control signal to the image capturer 1610 to set a focus on the estimated region of interest.

Figure 6:
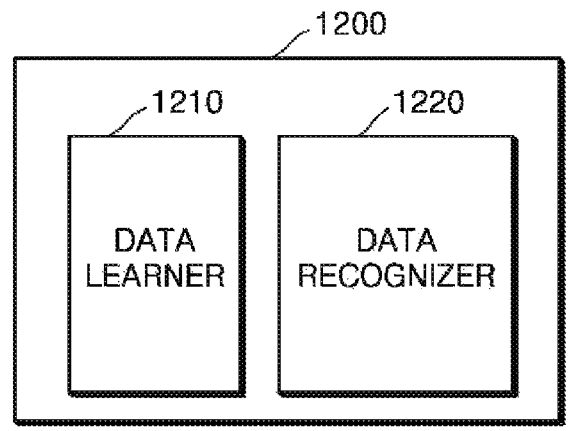
FIG. 6 is a block diagram of a controller according to an embodiment of the present disclosure.

FIG. 6 is a block diagram of a controller according to an embodiment of the present disclosure.

Referring to FIG. 6, a controller 1200 according to some embodiments may include a data learner 1210 and a data recognizer 1220.

In order to estimate a region of interest to a user in an image, the data learner 1210 may leans and/or train, such that a data recognition model (e.g., the first data recognition model or the second data recognition model of FIG. 3) obtains criteria for determining a region in an image corresponding to information of interest. The data learner 1210 may learn, such that a data recognition model obtains criteria for determining data to use to determine whether a region corresponds to information of interest and how to determine whether or not it corresponds to the information of interest. The data learner 1210 may obtain data to be used for learning and apply the obtained data to a data recognition model, thereby learning criteria for determining a region in an image corresponding to information of interest.

The data recognizer 1220 may determine a region of an image corresponding to information of interest based on various types of data. The data recognizer 1220 may determine a region of an image corresponding to information of interest by using data recognition model learned in correspondence to a certain condition from among the data recognition models. According to criteria obtained by respective data recognition models via learning, the data recognizer 1220 may apply a data recognition model by using a live-view image including at least one object as an input value, thereby determining a region of an image corresponding to information of interest. On the other hand, a result of estimating a region of interest to a user by determining a region of an image corresponding to information of interest by applying a data recognition model and a feedback of the user regarding the result may be used to update the data recognition model.

At least one of the data learner 1210 and the data recognizer 1220 may be fabricated as at least one hardware chip and mounted on an image processing apparatus. For example, at least one of the data learner 1210 and the data recognizer 1220 may be fabricated as a dedicated hardware chip for AI or may be fabricated as a portion of a general-purpose processor (e.g., a CPU or an AP) or a graphics processor (e.g., a GPU) and mounted on various image processing apparatuses as described above according to the related art.

In this case, the data learner 1210 and the data recognizer 1220 may be mounted on one image processing apparatus or may be respectively mounted on separate image processing apparatuses. For example, one of the data learner 1210 and the data recognizer 1220 may be included in an image processing apparatus and the other one may be included in a server. Furthermore, the data learner 1210 and the data recognizer 1220 may be connected to each other via a wire or wirelessly. Therefore, model information generated by the data learner 1210 may be provided to the data recognizer 1220 or data input to the data recognizer 1220 may be provided to the data learner 1210 as additional learning data.

At least one of the data learner 1210 and the data recognizer 1220 may be implemented as a software module. When at least one of the data learner 1210 and the data recognizer 1220 is implemented as a software module (or a program module including instructions), the software module may be stored in a non-transitory computer-readable recording medium. Furthermore, in this case, at least one software module may be provided by an OS or by a certain application. Alternatively, some of the at least one software module may be provided by an OS, and the remaining of the at least one software module may be provided by a certain application.

Figure 7:
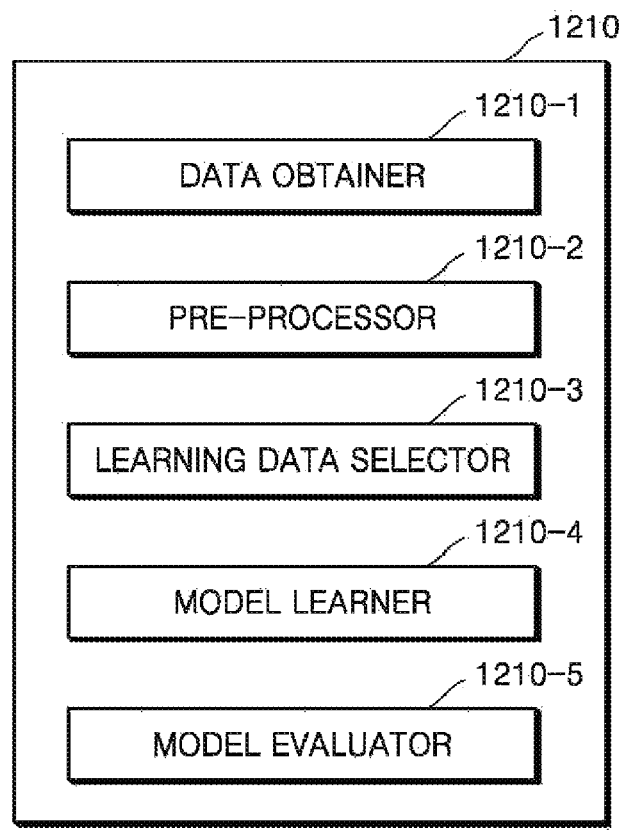
FIG. 7 is a block diagram of a data learner according to an embodiment of the present disclosure.

FIG. 7 is a block diagram of a data learner according to an embodiment of the present disclosure.

Referring to FIG. 7, the data learner 1210 according to some embodiments may include a data obtainer 1210-1, a pre-processor 1210-2, a learning data selector 1210-3, a model learner 1210-4, and a model evaluator 1210-5.

Figure 9:
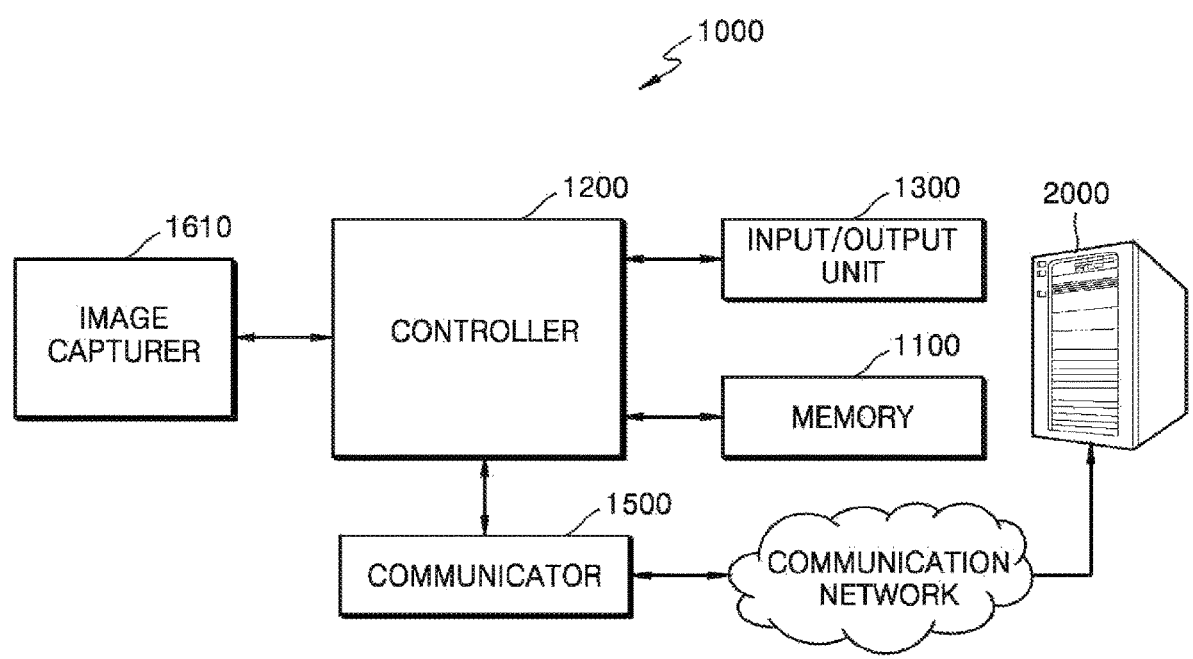
FIG. 9 is a block diagram for describing an image processing apparatus according to another embodiment of the present disclosure.

The data obtainer 1210-1 may obtain data for a data recognition model (e.g., the first data recognition model and the second data recognition model of FIG. 3) to learn to have criteria for determining a region of an image corresponding to information of interest. The data obtainer 1210-1 may obtain data for learning to determine whether a region of an image corresponding to information of interest For example, the data obtainer 1210-1 may obtain image data, e.g., an image, a moving picture, etc. The data obtainer 1210-1 may obtain data directly input via the image processing apparatus 1000 or selected data. Furthermore, the data obtainer 1210-1 may obtain various sensed information detected by various sensors in the image processing apparatus 1000. The data obtainer 1210-1 may also obtain data received from an external device, such as an external server 2000 (as shown in FIG. 9), communicating with the image processing apparatus 1000.

The data obtainer 1210-1 may obtain data received from a user, data captured by or previously stored in the image processing apparatus 1000, or data received from an external apparatus, such as a server, but the present disclosure is not limited thereto.

The pre-processor 1210-2 may pre-process obtained data, such that the obtained data may be used by a data recognition model to learn determination of whether a region in an image corresponds to information of interest. The pre-processor 1210-2 may process the obtained data into a pre-set format, such that the model learner 1210-4, as described below, may use the obtained data for learning.

For example, the pre-processor 1210-2 may remove noises from data, such as an image or a moving picture, obtained by the data obtainer 1210-1 so as to select effective data or process the data into a certain format.

The learning data selector 1210-3 may select data from among pre-processed data, the data for a data recognition model to learn to determine a region of an image corresponding to information of interest. The selected data may be provided to the model learner 1210-4. The learning data selector 1210-3 may select data from among pre-processed data and the data for a data recognition model to learn to determine a region of an image corresponding to information of interest, according to pre-set criteria for determining a region of an image corresponding to information of interest. Furthermore, the learning data selector 1210-3 may select data according to data selecting criteria that is pre-set based on learning of the model learner 1210-4 as described below.

The learning data selector 1210-3 may have data selecting criteria for each data type, such as image data and moving picture data, and may select data for learning using such selection criteria.

The learning data selector 1210-3 may select data for learning for a data recognition model to learn a region of an image corresponding to information of interest.

The model learner 1210-4 may learn, such that the data recognition model has criteria for determining a region of an image corresponding to information of interest based on learned data. Furthermore, the model learner 1210-4 may learn criteria for selecting learned data to use to determine a region of an image corresponding to information of interest.

The model learner 1210-4 may learn how a data recognition model may determine a region of an image corresponding to information of interest. For example, the model learner 1210-4 may learn how the first data recognition model may determine a region of an image corresponding to a salient region. Furthermore, the model learner 1210-4 may learn how the second data recognition model may determine a region of an image corresponding to personalized information of interest.

Furthermore, the model learner 1210-4 may train a data recognition model used to determine a region of an image corresponding to information of interest, by using learning data. In this case, the data recognition model may be a pre-constructed model. For example, the data recognition model may be a model constructed in advance by receiving basic learning data (e.g., a sample text, etc.).

The model learner 1210-4 may train a data recognition model through, for example, supervised learning using learning data as an input value. Furthermore, the model learner 1210-4 may train a data recognition model through unsupervised learning for figuring out criteria for determining a region of an image corresponding to information of interest by self-learning, for example, a type of data for determining a region of an image corresponding to information of interest, without any particular supervision. Alternatively, the model learner 1210-4 may train a data recognition model through reinforced learning using a feedback regarding whether a result of determining a region of an image corresponding to information of interest based on learning is correct.

According to an embodiment, the model learner 1210-4 may learn, such that the first data recognition model has criteria for determining a region of interest by using learning data including an image and coordinate information regarding a region of the image, the region with at least one of colors or shapes different from surrounding regions.

For example, the model learner 1210-4 may perform learning by using a supervised learning method using learning data including an image and coordinate information regarding a region in which a shape of a person included in the image is located, as shown in FIG. 4A.

Therefore, the first data recognition model trained by the model learner 1210-4 may recognize objects included in a live-view image generated by the image capturing apparatus 1000 and estimate a region in which an object having a color and/or a shape different from those of surrounding regions from among the recognized objects is located as a region of interest.

Furthermore, according to an embodiment, the model learner 1210-4 may learn, such that second data recognition model has criteria for estimating a region of interest by using an image captured by a user via the image capturing apparatus 1000.

For example, the model learner 1210-4 may learn to have criteria for estimating a region of interest by receiving an image captured by a user as shown in FIG. 5A, by using an unsupervised learning method.

Specifically, the model learner 1210-4 may recognize an object in an image captured by a user. For example, the model learner 1210-4 may recognize objects in each of a plurality of images that are captured by a user and stored in a gallery application. The model learner 1210-4 may categorize objects of similar types according to types of recognized objects. Alternatively, the model learner 1210-4 may select priorities of groups generated according to capture frequencies of recognized objects. Therefore, the model learner 1210-4 may learn by using objects mainly and frequently captured by a user of the image capturing apparatus 1000.

Therefore, the second data recognition model trained by the model learner 1210-4 may estimate a region in which an object highly preferred by a user from among objects included in a live-view image generated by the image processing apparatus 1000 is located as a region of interest. In other words, the second data recognition model may estimate a region of interest customized to preferences of a user using the image capturing apparatus 1000.

According to various embodiments, the image processing apparatus 1000 may generate a fourth data recognition model trained to estimate some objects highly preferred by a user based on the second data recognition model. For example, the model learner 1210-4 may generate a group A, a group B, a group C, and a group D as a result of learning an image captured by the user. At this time, the image processing apparatus 1000 may generate the fourth data recognition model capable of detecting only objects belonging to the group A having the highest capture frequency from among objects detected in the image captured by the user. In this case, the image processing apparatus 1000 may use the second data recognition model and the fourth data recognition model selectively or sequentially according to a given situation.

A data recognition model may be constructed by taking into account a field to which the data recognition model is to be applied, a purpose of learning, or computer performance of a device. A data recognition model may be, for example, a model based on a neural network. For example, a model like a deep neural network (DNN), a recurrent neural network (RNN), and a bidirectional recurrent deep neural network (BRDNN) may be used as a data recognition model, but is not limited thereto.

According to various embodiments, when a plurality of pre-constructed data recognition model exist, the model learner 1210-4 may determine a data recognition model corresponding to input learning data and basic learning data that are closely related to each other as data recognition model to train. In this case, the basic learning data may be pre-categorized according to types of data, and data recognition models may be pre-constructed for respective types of data. For example, the basic learning data may be pre-categorized according to various criteria including regions where learning data is generated, time points at which the learning data is generated, sizes of the learning data, genres of the learning data, creators of the learning data, types of objects in the learning data, etc.

The model learner 1210-4 may also train a data recognition model by using, for example, a learning algorithm including error back-propagation or gradient descent.

Furthermore, when a data recognition model is learned, the model reader 1210-4 may store the learned data recognition model. In this case, the model learner 1210-4 may store the learned data recognition model in a memory of an image processing apparatus that includes the data recognizer 1220. Alternatively, the model learner 1210-4 may store the learned data recognition model in a memory of a server connected to an image processing apparatus via a wired or wireless network.

In this case, the memory in which the learned data recognition model is stored may also store instructions or data associated with, for example, at least one other component of the image processing apparatus. The memory may also store software and/or programs. The program may include, for example, a kernel, a middleware, an application programming interface (API), and/or an application program (or "application").

The model evaluator 1210-5 may input evaluation data to a data recognition model and, when a recognition result output from the evaluation data does not satisfy certain criteria, the model evaluator 1210-5 may make the model learner 1210-4 to learn again. In this case, the evaluation data may be pre-set data for evaluating a data recognition model.

For example, when the number or a ratio of evaluation data with incorrect recognition results from among recognition results of a learned data recognition model with respect to evaluation data exceeds a pre-set critical value, the model evaluator 1210-5 may evaluate that a certain criterion are not satisfied. For example, when the certain criterion is defined as a ratio of 2% and the learned data recognition model outputs incorrect recognition results for evaluation data exceeding 20 out of a total of 1000 pieces of evaluation data, the model evaluator 1210-5 may evaluate that the learned data recognition model is inappropriate.

On the other hand, when there are a plurality of learned data recognition models, the model evaluator 1210-5 may evaluate whether each of the learned data recognition models satisfies certain criteria and may determine one satisfying the certain criteria as a final data recognition model. In this case, when there are a plurality of data recognition models satisfying the certain criteria, the model evaluator 1210-5 may determine any pre-set one or a certain number of data recognition models in a descending order of evaluation scores as final data recognition models.

According to various embodiments, the data learner 1210 may include the data obtainer 1210-1 and the model learner 1210-4 and may selectively include the pre-processor 1210-2, the learning data selector 1210-3, and the model evaluator 1210-5.

At least one of the data obtainer 1210-1, the pre-processor 1210-2, the learning data selector 1210-3, the model learner 1210-4, and the model evaluator 1210-5 in the data learner 1210 may be fabricated as at least one hardware chip and mounted on an image processing apparatus. For example, at least one of the data obtainer 1210-1, the pre-processor 1210-2, the learning data selector 1210-3, the model learner 1210-4, and the model evaluator 1210-5 may be fabricated as a dedicated hardware chip for AI or may be fabricated as a portion of a general-purpose processor (e.g., a CPU or an AP) or a graphics processor (e.g., a GPU) and mounted on various image processing apparatuses as described above according to the related art.

Furthermore, the data obtainer 1210-1, the pre-processor 1210-2, the learning data selector 1210-3, the model learner 1210-4, and the model evaluator 1210-5 may be mounted on a single image processing apparatus or may be respectively mounted in separate image processing apparatuses. For example, some of the data obtainer 1210-1, the pre-processor 1210-2, the learning data selector 1210-3, the model learner 1210-4, and the model evaluator 1210-5 may be included in an image processing apparatus, and the rest may be included in a server.

Furthermore, at least one of the data obtainer 1210-1, the pre-processor 1210-2, the learning data selector 1210-3, the model learner 1210-4, and the model evaluator 1210-5 may be implemented as a software module. When at least one of the data obtainer 1210-1, the pre-processor 1210-2, the learning data selector 1210-3, the model learner 1210-4, and the model evaluator 1210-5 is implemented as a software module (or a program module including instructions), the software module may be stored in a non-transitory computer-readable recording medium. Furthermore, in this case, at least one software module may be provided by an OS or by a certain application. Alternatively, some of the at least one software module may be provided by an OS, and the remaining of the at least one software module may be provided by a certain application.

Figure 8:
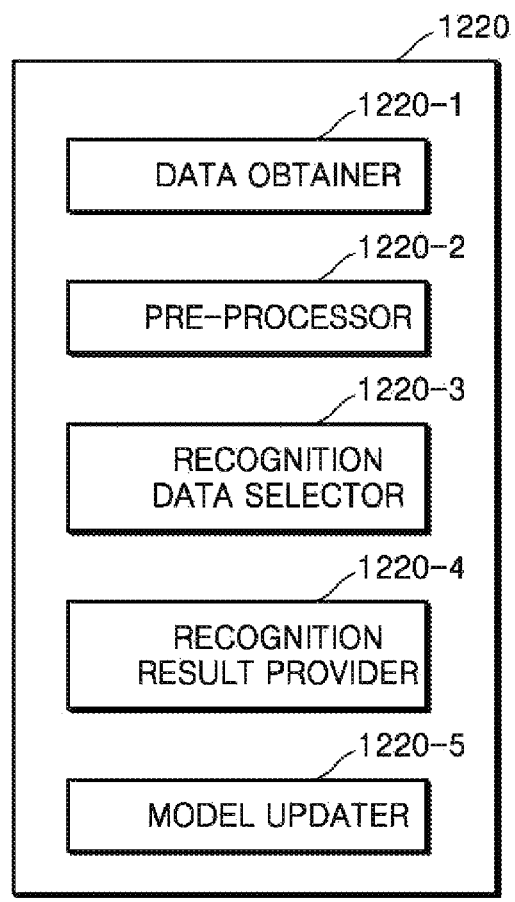
FIG. 8 is a block diagram of a data recognizer according to an embodiment of the present disclosure.

FIG. 8 is a block diagram of a data recognizer according to an embodiment of the present disclosure.

Referring to FIG. 8, the data recognizer 1220 according to some embodiments includes a data obtainer 1220-1, a pre-processor 1220-2, a recognition data selector 1220-3, a recognition result provider 1220-4, and a model updater 1220-5.

By using a data recognition model corresponding to a certain condition from among a plurality of learned data recognition models, the data recognizer 1220 may determine a region of an image corresponding to information of interest according to criteria for the data recognition model to determine whether a region of an image corresponds to learned information of interest.

The data obtainer 1220-1 may obtain various types of data for determining a region of an image corresponding to information of interest. For example, the data obtainer 1220-1 may obtain video data, such as an image and a moving picture. For example, the data obtainer 1220-1 may obtain data directly input from the image processing apparatus 1000 or selected data or may obtain various sensing information detected by various sensors in the image processing apparatus 1000. The data obtainer 1220-1 may also obtain data received from an external device, such as the external server 2000, communicating with the image processing apparatus 1000.

The pre-processor 1220-2 may pre-process obtained data, such that the obtained data may be used by a data recognition model to determine a region of an image corresponding to information of interest. The pre-processor 1220-2 may process the obtained data into a pre-set format, such that the recognition result provider 1220-4, as described below, may use the obtained data for determining a region of an image corresponding to information of interest.

For example, the pre-processor 1220-2 may remove noises from data, such as an image or a moving picture, obtained by the data obtainer 1220-1 so as to select effective data or process the data into a certain format.

The recognition data selector 1220-3 may select data from among the pre-processed data, the data for a data recognition model to determine a region of an image corresponding to information of interest. The selected data may be provided to the recognition result provider 1220-4. The recognition data selector 1220-3 may select some or all of the pre-processed data according to certain criteria for determining a region of an image corresponding to information of interest. Furthermore, the recognition data selector 1220-3 may select data according to criteria pre-set based on learning by the model learner 1210-4, which will be described below.

The recognition result provider 1220-4 may apply the selected data to a data recognition model, thereby determining a region of an image corresponding to information of interest. The recognition result provider 1220-4 may provide a region of an image corresponding to information of interest according to purposes of data recognition. The recognition result provider 1220-4 may use data selected by the recognition data selector 1220-3 as an input value, thereby applying selected data to a data recognition model. Furthermore, to recognition result may be determined by a data recognition model. The recognition result provider 1220-4 may determine a region of an image corresponding to information of interest based on a data recognition model corresponding to a certain condition from among a plurality of data recognition models.

When a first condition is satisfied, the recognition result provider 1220-4 may estimate a salient region as a region of interest to a user according to criteria for a first data recognition model to determine whether a region corresponds to a learned salient region. The first data recognition model may use criteria for determining whether a region corresponds to a learned salient region when determining a salient region in a live-view image obtained from the image capturer 1610.

For example, when the image processing apparatus 1000 satisfies a first condition, the recognition result provider 1220-4 may detect a telephone booth in an input image as shown in FIG. 4B by using a first data recognition model and estimate a region in which the telephone booth is located as a region of interest.

When a second condition is satisfied, the recognition result provider 1220-4 may estimate a region corresponding to personalized information of interest as a region of interest to a user, according to criteria for a second data recognition model to determine whether a region corresponds to personalized information of interest. The second data recognition model may use criteria for determining whether a region corresponds to learned personalized information of interest when determining a region of a live-view image obtained by the image capturer 1610, the region corresponding to learned personalized information of interest.

For example, when the image processing apparatus 1000 satisfies a second condition, the recognition result provider 1220-4 may detect a face of a child in an input image as shown in FIG. 5B by using a second data recognition model and estimate a region in which the face of the child is located as a region of interest.

Furthermore, when a model learner (e.g., the model learner 1210-4 of FIG. 7) learns images captured by a user and shapes similar to automobiles appear in the images most frequently, the recognition result provider 1220-4 may detect a shape similar to automobiles in an input image as shown in FIG. 5A and estimate a region in which the shape similar to automobiles is located as a region of interest.

In other words, when a second condition is not satisfied during a short period of time after a user purchases the image processing apparatus 1000, the image processing apparatus 1000 may estimate a region of interest by using a first data recognition model. Furthermore, when the second condition is satisfied as the number of images captured by the image processing apparatus 1000 increases, the image processing apparatus 1000 may estimate a region of interest by using a second data recognition model and/or a fourth data recognition model.

The model updater 1220-5 may update a data recognition model based on an evaluation of a recognition result provided by the recognition result provider 1220-4. For example, the model updater 1220-5 may provide a result provided by the recognition result provider 1220-4, the result of determining a region of an image corresponding to information of interest to the model learner 1210-4, and thus the model learner 1210-4 may update a data recognition model.

According to various embodiments, the data recognizer 1220 may include the data obtainer 1220-1 and the recognition result provider 1220-4 and may selectively include the pre-processor 1230-2, the recognition data selector 1220-3, and the model updater 1220-5.

At least one of the data obtainer 1220-1, the pre-processor 1220-2, the recognition data selector 1220-3, the recognition result provider 1220-4, and the model updater 1220-5 in the data recognizer 1220 may be fabricated as at least one hardware chip and mounted on an image processing apparatus. For example, at least one of the data obtainer 1220-1, the pre-processor 1220-2, the recognition data selector 1220-3, the recognition result provider 1220-4, and the model updater 1220-5 may be fabricated as a dedicated hardware chip for AI or may be fabricated as a portion of a general-purpose processor (e.g., a CPU or an AP) or a graphics processor (e.g., a GPU) and mounted on various image processing apparatuses as described above according to the related art.

Furthermore, the data obtainer 1220-1, the pre-processor 1220-2, the recognition data selector 1220-3, the recognition result provider 1220-4, and the model updater 1220-5 may be mounted on a single image processing apparatus or may be respectively mounted in separate image processing apparatuses. For example, some of the data obtainer 1220-1, the pre-processor 1220-2, the recognition data selector 1220-3, the recognition result provider 1220-4, and the model updater 1220-5 may be included in an image processing apparatus, and the rest may be included in a server.

Furthermore, at least one of the data obtainer 1220-1, the pre-processor 1220-2, the recognition data selector 1220-3, the recognition result provider 1220-4, and the model updater 1220-5 may be implemented as a software module. When at least one of the data obtainer 1220-1, the pre-processor 1220-2, the recognition data selector 1220-3, the recognition result provider 1220-4, and the model updater 1220-5 is implemented as a software module (or a program module including instructions), the software module may be stored in a non-transitory computer-readable recording medium. Furthermore, in this case, at least one software module may be provided by an OS or by a certain application. Alternatively, some of the at least one software module may be provided by an OS, and the remaining of the at least one software module may be provided by a certain application.

FIG. 9 is a block diagram for describing an image processing apparatus according to another embodiment of the present disclosure. It will be obvious to one of ordinary skill in the art that general-purpose components other than the components shown in FIG. 9 may be further included. Detailed descriptions of the components described above with reference to FIGS. 1A and 1B will be omitted.

Referring to FIG. 9, an external server 2000 may categorize images captured by a user according to certain criteria and train a third data recognition model by using the categorized images, thereby obtaining criteria for determining whether a region corresponds to personalized information of interest.

According to an embodiment, the third data recognition model may be trained similarly as the second data recognition model to obtain criteria for determining information of interest customized to a user.

The image processing apparatus 1000 may further include a communicator 1500 for receiving criteria for the third data recognition model to determine whether a region corresponds to personalized information of interest by using images of the user stored in the external server 2000.

According to criteria for determining whether a region corresponds to personalized information of interest received by a data recognition model provided in the image processing apparatus 1000 from the external server 2000, at least one processor constituting the controller 1200 may estimate a region corresponding to the personalized information of interest as a region of interest in a live-view image.

The image processing apparatus 1000 may transmit a live-view image obtained by the image processing apparatus 1000 to the external server 2000 through the communicator 1500. The external server 2000 may estimate a region of the live-view image transmitted from the image processing apparatus 1000 as a region of interest to a user according to criteria for a third data recognition model to determine whether a region corresponds to personalized information of interest and may also transmit information regarding the estimated region of interest to the image processing apparatus 1000.

Figure 10:
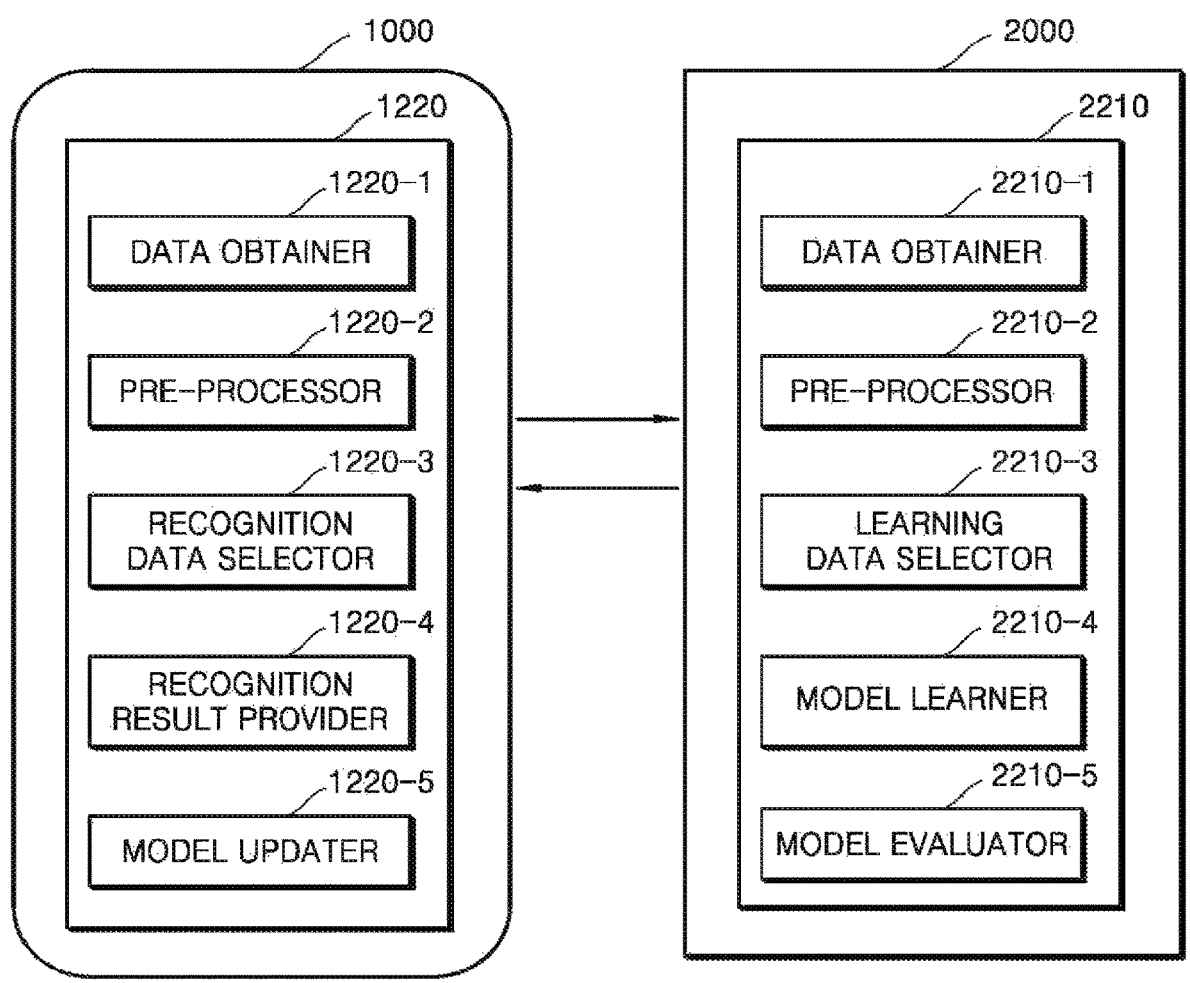
FIG. 10 is a diagram showing an example in which an image processing apparatus and an external server operate in conjunction with each other to learn and recognize data, according to various embodiments of the present disclosure.

FIG. 10 is a diagram showing an example that an image processing apparatus and an external server operate in conjunction with each other to learn and recognize data, according to various embodiments of the present disclosure.

Referring to FIG. 10, the external server 2000 may learn criteria for determining a region of an image corresponding to information of interest, and the image processing apparatus 1000 may determine a region of an image corresponding to information of interest by using a data recognition model trained by the external server 2000.

In this case, a data learner 2210 of the external server 2000 may perform the function of the data learner 1210 shown in FIG. 7. The data learner 2210 may include a data obtainer 2210-1, a pre-processor 2210-2, a learning data selector 2210-3, a model learner 2210-4 and a model evaluator 2210-5. The data learner 2210 of the external server 2000 may learn criteria for determining data to use to determine a region of an image corresponding to information of interest and how to determine a region of an image corresponding to information of interest by using the data. The data learner 2210 of the external server 2000 may obtain data to be used for learning and apply the obtained data to a data recognition model to be described below, thereby learning criteria for determining a region of an image corresponding to information of interest.

Furthermore, the recognition result provider 1220-4 of the image processing apparatus 1000 may apply data selected by the recognition data selector 1220-3 to a data recognition model generated by the external server 2000, thereby determining a region of an image corresponding to information of interest. For example, the recognition result provider 1220-4 may transmit data selected by the recognition data selector 1220-3 to the external server 2000 and request the external server 2000 to apply the data selected by the recognition data selector 1220-3 to a data recognition model and determine a region of an image corresponding to information of interest. Furthermore, the recognition result provider 1220-4 may receive from the external server 2000 a region of an image corresponding to information of interest, the region determined by the external server 2000.

For example, the image processing apparatus 1000 may transmit a live-view image obtained by the image processing apparatus 1000 to the external server 2000. The external server 2000 may determine a region of an image corresponding to information of interest by applying the live-view image received from the image processing apparatus 1000 to a data recognition model stored in the external server 2000. The external server 2000 may further reflect images of a user stored in the external server 2000 to determine a region of an image corresponding to information of interest. The region of the image corresponding to the information of interest, the region determined by the external server 2000 may be transmitted to the image processing apparatus 1000.

Alternatively, the recognition result provider 1320-4 of the image processing apparatus 1000 may receive a data recognition model generated by the external server 2000 from the external server 2000 and determine a region of an image corresponding to information of interest by using the received data recognition model. In this case, the recognition result provider 1220-4 of the image processing apparatus 1000 applies the data selected by the recognition data selector 1220-3 to the data recognition model received from the external server 2000, thereby determining a region of the image corresponding to information of interest.

For example, the image processing apparatus 1000 may apply a live-view image obtained by the image processing apparatus 1000 to a data recognition model received from the external server 2000, thereby determining a region of the live-view image corresponding to information of interest. The external server 2000 may transmit images of a user stored in the external server 2000 to the image processing apparatus 1000, such that the image processing apparatus 1000 may further utilize the images of the user to determine a region of an image corresponding to information of interest FIG. 11 is a block diagram for describing an image processing apparatus according to another embodiment of the present disclosure.

Figure 11:
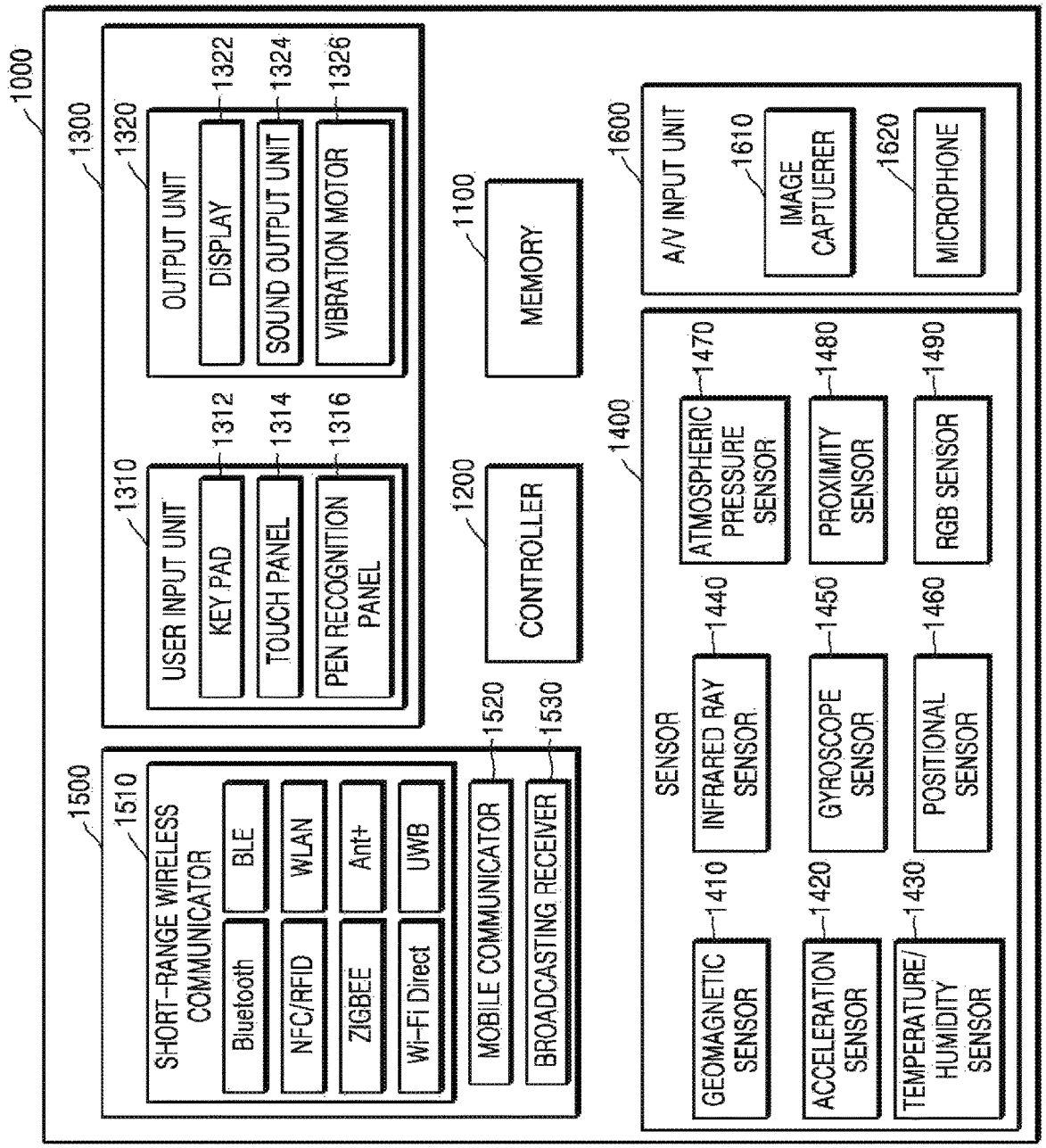
FIG. 11 is a block diagram for describing an image processing apparatus according to an embodiment of the present disclosure.

Referring to FIG. 11, the image processing apparatus 1000 according to another embodiment may include the memory 1100, the controller 1200, the input/output unit 1300, a sensor 1400, the communicator 1500, and an audio/visual (A/V) input unit 1600.

The memory 1100 may store a program for processing and controlling of the controller 1200 and may also store data input to or output from the image processing apparatus 1000. The memory 1100 may store computer executable instructions.

The memory 1100 may include at least one of a flash memory type memory, a hard disk type memory, a multimedia card micro type memory, a card type memory (e.g., secure digital (SD) memory or extreme digital (XD) memory), random access memory (RAM), static random access memory (SRAM), read only memory (ROM), electrically erasable-programmable read-only memory (EEPROM), programmable read-only memory (PROM), a magnetic memory, a magnetic disk, and an optical disc.

Programs stored in the memory 1100 may be categorized into a plurality of modules according to their functions, e.g., a user interface (UI) module, a touch screen module, a notification module, etc.

A UI module may provide a specialized UI or a graphics user interface (GUI) interlocked with the image processing apparatus 1000 for each application. The touch screen module may sense a touch gesture of a user on a touch screen and may transmit information regarding the touch gesture to the controller 1200. The touch screen module according to an embodiment may recognize and analyze a touch code. The touch screen module may be configured as separate hardware. The user's touch gestures may include tap, touch-and-hold, double tap, drag, pan, flick, drag-and-drop, swipe, etc. The notification module may generate a signal for notifying the occurrence of an event of the image processing apparatus 1000. Examples of events occurring in the image processing apparatus 1000 include message reception, key signal input, content input, content transmission, and detection of content corresponding to a certain condition. The notification module may output a notification signal in the form of a video signal through a display 1322, may output a notification signal in the form of an audio signal through a sound output unit 1324, or may output a notification signal in the form of a vibration signal through a vibration motor 1326.

The controller 1200 typically controls the overall operation of the image processing apparatus 1000. For example, the controller 1200 may control the overall operations of the input/output unit 1300, the sensor 1400, the communicator 1500, and the A/V input unit 1600 by executing programs stored in the memory 1100

Specifically, the controller 1200 may include at least one processor. The controller 1200 may include at least one integrated type processor or a plurality of processors, depending on functions and roles of the controller 1200.

The at least one processor constituting the controller 1200 may execute a computer-executable instruction stored in the memory 1100, thereby, based on a data recognition model corresponding to a certain condition from among data recognition models, estimating a region of interest to a user in an obtained live-view image according to criteria for the data recognition model to determine whether a region corresponds to learned information of interest and setting a focus on the estimated region of interest.

The at least one processor constituting the controller 1200 may estimate a salient region as a region of interest to a user according to criteria for a first data recognition model to determine whether a region corresponds to a learned salient region when a first condition is satisfied and may estimate a region corresponding to personalized information of interest as a region of interest to the user according to criteria for a second data recognition model to determine whether a region corresponds learned personalized information of interest when a second condition is satisfied.

The learned data recognition model may be stored in a server outside the image processing apparatus 1000 and may be received from the server upon a request of the image processing apparatus 1000.

The input/output unit 1300 may include a user input unit 1310 and an output unit 1320. The user input unit 1310 and the output unit 1320 constituting the input/output unit 1300 may be separated from each other or may be integrated with each other like a touch screen.

The input/output unit 1300 may display a live-view image in which a focus is set on an estimated region of interest.

The user input unit 1310 may refer to a unit for a user to input data for controlling the image processing apparatus 1000. The user input unit 1310 may receive an abbreviated word from a user and receive a selection of a sentence corresponding to the abbreviated word from the user.

The user input unit 1310 may include a key pad 1312, a touch panel 1314 (contact capacitance type, pressure resistive type, infrared ray detection type, surface acoustic wave conduction type, integral tension measuring type, a piezo effect type, etc.), a pen recognition panel 1316, etc. Furthermore, the user input unit 1310 may include a jog wheel and a jog switch, but is not limited thereto.

The output unit 1320 may output a result of executing the application on the image processing apparatus 1000. The output unit 1320 may output a result of operating the image processing apparatus 1000. When there is a user input, the output unit 1320 may output the result changed by to the user input.

The output unit 1320 may output an audio signal, a video signal, or a vibration signal. The output unit 1320 may include the display 1322, the sound output unit 1324, and the vibration motor 1326.

The display 1322 displays information processed in the image processing apparatus 1000. For example, the display 1322 may display an execution screen image of a camera application or a user interface for receiving a user input.

Meanwhile, when the display 1322 and the touch pad constitute a touch screen in a layer structure, the display 1322 may be used as an input device in addition to as an output device. The display 1322 may include at least one of a liquid crystal display, a thin film transistor-liquid crystal display, an organic light-emitting diode, a flexible display, a three-dimensional display, and an electrophoretic display. Furthermore, the electronic device 100a may include two or more displays 1322 depending on implementations of the image processing apparatus 1000. In this case, the two or more displays 1322 may face each other across a hinge.

The sound output unit 1324 may output audio data that is received from the communicator 1500 or stored in the memory 1100. Furthermore, the sound output unit 1324 may output an audio signal related to functions processed in the image processing apparatus 1000 (e.g., a call signal receiving sound, a message receiving sound, and a notification sound). Such the sound output unit 1324 may include a speaker, a buzzer, etc.

The vibration motor 1326 may output a vibration signal. For example, the vibration motor 1326 may output a vibration signal corresponding to an output of audio data or video data (e.g., a call signal receiving sound, a message receiving sound, etc.) Furthermore, the vibration motor 1326 may output a vibration signal when a touch is input onto the touch screen.

The sensor 1400 may detect a status of the image processing apparatus 1000 or an ambient status of the image processing apparatus 1000 and transfer detected information to the controller 1200.

The sensor 1400 may include at least one of a geomagnetic sensor 1410, an acceleration sensor 1420, a temperature/humidity sensor 1430, an infrared ray sensor 1440, a gyroscope sensor 1450, a positional sensor 1460 (e.g., a global positioning system (GPS)), an atmospheric pressure sensor 1470, a proximity sensor 1480, and a red, green, blue (RGB) sensor (illuminance sensor), but is not limited thereto. Since functions of the respective sensors may be intuitively inferred by one of ordinary skill in the art, detailed description thereof will be omitted.

The communicator 1500 may include at least one of components which enable communication between the electronic device 100a and an external device (not shown) or between the electronic device 100a and a server (not shown). For example, the communicator 1500 may include a short-range wireless communicator 1510, a mobile communicator 1520, and a broadcasting receiver 1530.

The short-range wireless communicator 1510 may include a Bluetooth communicator, a Bluetooth low energy (BLE) communicator, a near field communicator, a wireless local area network (WLAN) or Wi-Fi communicator, a Zigbee communicator, an infrared data association (IrDA) communicator, a Wi-Fi Direct (WFD) communicator, an ultra wideband (UWB) communicator, and an Ant+ communicator, but is not limited thereto.

The mobile communicator 1520 may transceive wireless signals to and from at least one of a base station, an external terminal, and a server on a mobile communication network. The wireless signals may include various types of data for transceiving audio call signals, video communication call signals, or text/multimedia messages.

The broadcasting receiver 1530 may receive broadcasting signals and/or information related to broadcasting from the outside via broadcasting channels. The broadcasting channels may include satellite channels and ground wave channels. According to some embodiments, the electronic device 100a may not include the broadcasting receiver 1530.

Furthermore, the communicator 1500 may communicate with other devices, servers, and peripheral devices, in order to transceive or upload contents.

The A/V input unit 1600 is a unit for inputting audio signals or video signals and may include a camera 1610 and a microphone 1620. The camera 1610 may obtain image frames including a still image or a moving picture via an imaging device in a video call mode or an image capturing mode. An image captured by the imaging device may be processed by the controller 1200 or a separate image processor (not shown).

An image frame processed by the image capturer 1610 may be stored in the memory 1100 or transmitted to an external device through the communicator 1500. Two or more image capturers 1610 may be included according to the configuration of the image processing apparatus 1000.

The microphone 1620 receives an external sound signal and processes the external sound signal into electrical sound data. For example, the microphone 1620 may receive a sound signal from an external device or a speaker. The microphone 1620 may use various noise reduction algorithms to remove noises generated during reception of an external sound signal.

Figure 12:
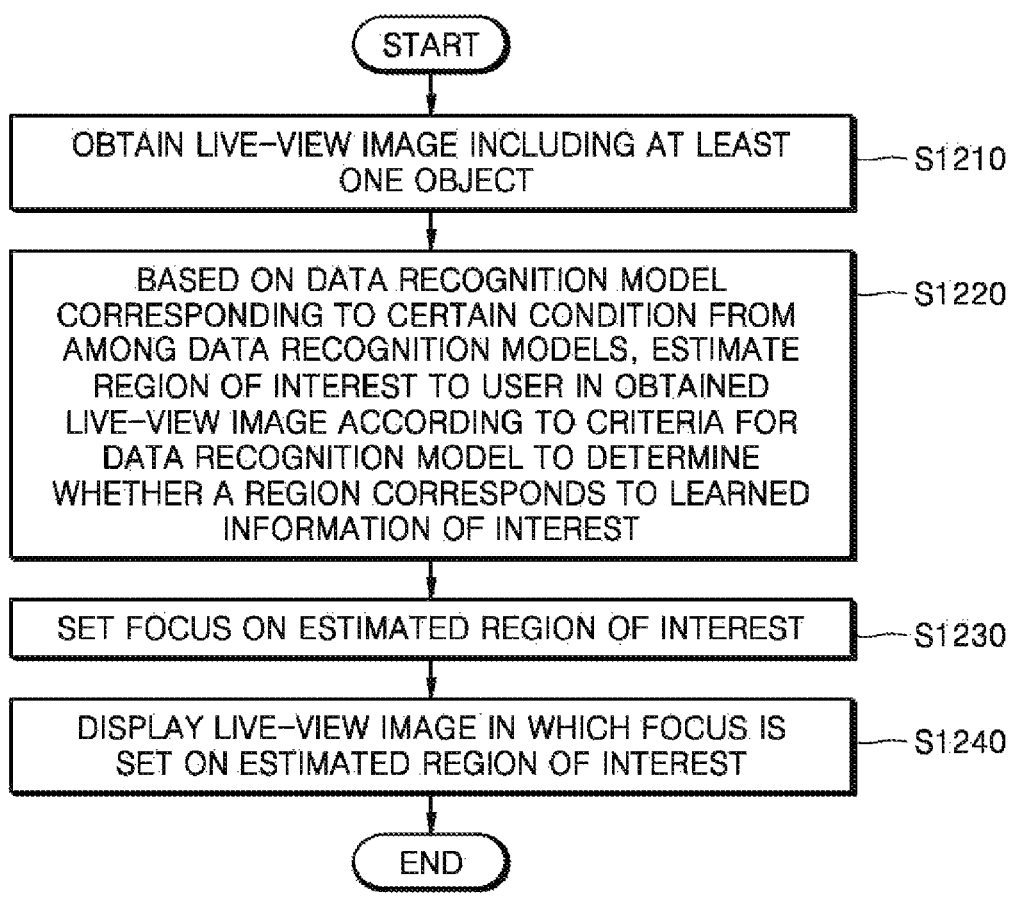
FIG. 12 is a flowchart of an image processing method according to an embodiment of the present disclosure.

FIG. 12 is a flowchart of an image processing method according to an embodiment of the present disclosure.

Referring to FIG. 12, in operation S1210, the image processing apparatus 1000 obtains a live-view image including at least one object.

In operation S1220, based on a data recognition model corresponding to a certain condition from among data recognition models, the image processing apparatus 1000 may estimate a region of interest to a user in the obtained live-view image according to criteria for the data recognition model to determine whether a region corresponds to learned information of interest.

The image processing apparatus 1000 may estimate a salient region as a region of interest to a user according to criteria for a first data recognition model to determine whether a region corresponds to a learned salient region when a first condition is satisfied and may estimate a region corresponding to personalized information of interest as a region of interest to the user according to criteria for a second data recognition model to determine whether a region corresponds learned personalized information of interest when a second condition is satisfied. A salient region may be determined according to certain criteria regarding areas occupied by objects in an image or color distribution of an image, and personalized information of interest may be determined based on certain statistics regarding images of a user stored in the image processing apparatus 1000. The second condition refers to a case where the number of images stored in the image processing apparatus 1000 is greater than a certain number and the reliability of personalized information of interest satisfies a certain condition, whereas the first condition refers to a case where the second condition is not satisfied.

The image processing apparatus 1000 may categorize images of a user according to certain criteria, train a third data recognition model by using the categorized images, and perform a communication with the external server 2000 to obtain criteria for determining whether a region corresponds to personalized information of interest. The image processing apparatus 1000 may receive criteria for the third data recognition model to determine whether a region corresponds to learned personalized information of interest by using images of a user stored in the external server 2000 from the external server 2000. A region corresponding to the personalized information of interest may be estimated as a region of interest to the user according to criteria for a data recognition model provided in the image processing apparatus 1000 to determine whether a region corresponds to received personalized information of interest.

The image processing apparatus 1000 may estimate a region corresponding to information of interest having a high priority as a region of interest to the user, based on priorities of information of interest. When a plurality of regions of interest are estimated, the image processing apparatus 1000 may perform multi-focusing for setting focuses on all of the plurality of regions of interest. When a plurality of regions of interest are estimated, the image processing apparatus 1000 may set a focus on a region of interest selected by a user.

In operation S1230, the image processing apparatus 1000 sets a focus on the estimated region of interest.

In operation S1240, the image processing apparatus 1000 displays a live-view image in which a focus is set on the estimated region of interest. The image processing apparatus 1000 may capture an image with a focus set on the estimated region of interest in response to an image capture command from a user.

Figure 13:
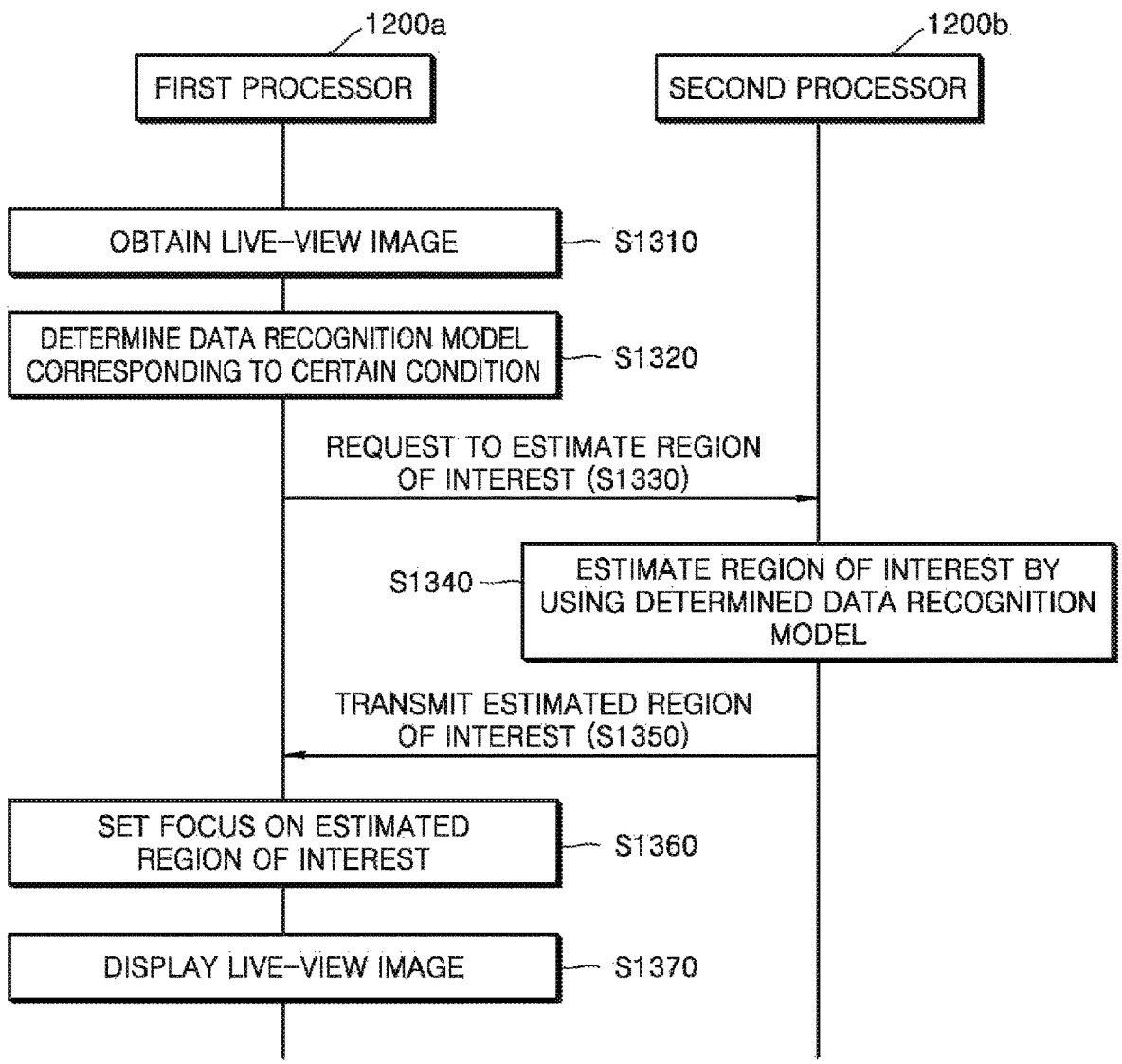
FIG. 13 is a flowchart for describing a case of estimating a region of interest when an image processing apparatus includes a first processor and a second processor according to an embodiment of the present disclosure.

FIG. 13 is a flowchart for describing a case of estimating a region of interest when an image processing apparatus includes a first processor and a second processor according to an embodiment of the present disclosure.

Referring to FIG. 13, the first processor 1200*a* may control the execution of at least one application installed on the image processing apparatus 1000 and perform graphics processing on an image (e.g., a live-view image, a captured image, etc.) obtained by the image processing apparatus 1000. The first processor 1200*a* may be implemented as a SoC in which functions of a CPU, a GPU, a communication chip, and a sensor are integrated. Furthermore, the first processor 1200*a* may be referred to as an AP in the present specification.

The second processor 1200*b* may estimate a region of interest to an image by using a data recognition model.

The second processor 1200*b* may be fabricated as a dedicated hardware chip for AI that performs a function for estimating a region of interest by using a data recognition model. According to various embodiments, the dedicated hardware chip for AI may include a GPU for the data recognition model including visual understanding as an elemental technology.

According to an embodiment, the image processing apparatus 1000 may include the first processor 1200*a* and the second processor 1200*b*.

In operation S1310, the first processor 1200*a* may obtain a live-view image. A live-view image may include at least one object.

In operation S1320, the first processor 1200*a* may determine a data recognition model corresponding to a certain condition.

For example, the first processor 1200*a* may determine to use a second data recognition model or a fourth data recognition model when the image processing apparatus 1000 satisfies the second condition described above with reference to FIG. 3. According to an embodiment, the first processor 1200*a* may select either a second data recognition model or a fourth data recognition model depending on a default value set by a manufacturer of the image processing apparatus 1000 or a user selection.

Furthermore, when the image processing apparatus 1000 does not satisfy a second condition, the first processor 1200*a* may determine that a first condition is satisfied and determine to use a first data recognition model.

In operation S1330, the first processor 1200*a* may request the second processor 1200*b* to estimate a region of interest by using the determined data recognition model.

In operation S1340, the second processor 1200*b* may estimate the region of interest by using the determined data recognition model.

For example, when it is determined to use the first data recognition model, the second processor 1200*b* may estimate a salient region as a region of interest to a user according to criteria for the first data recognition model to determine whether a region corresponds to learned salient region. When it is determined to use the second data recognition model, the second processor 1200*b* may estimate a region corresponding to personalized information of interest as a region of interest to a user according to criteria for the second data recognition model to determine whether a region corresponds to learned personalized information.

When it is determined to use the fourth data recognition model, the second processor 1200b may estimate a region corresponding to personalized information of interest by using the fourth data recognition model.

In operation S1350, the second processor 1200b may transmit the estimated region of interest to the first processor 1200a.

In operation S1360, the first processor 1200a may set a focus on the estimated region of interest.

In operation S1370, the first processor 1200a may display a live-view image in which a focus is set on the estimated region of interest.

Figure 14:
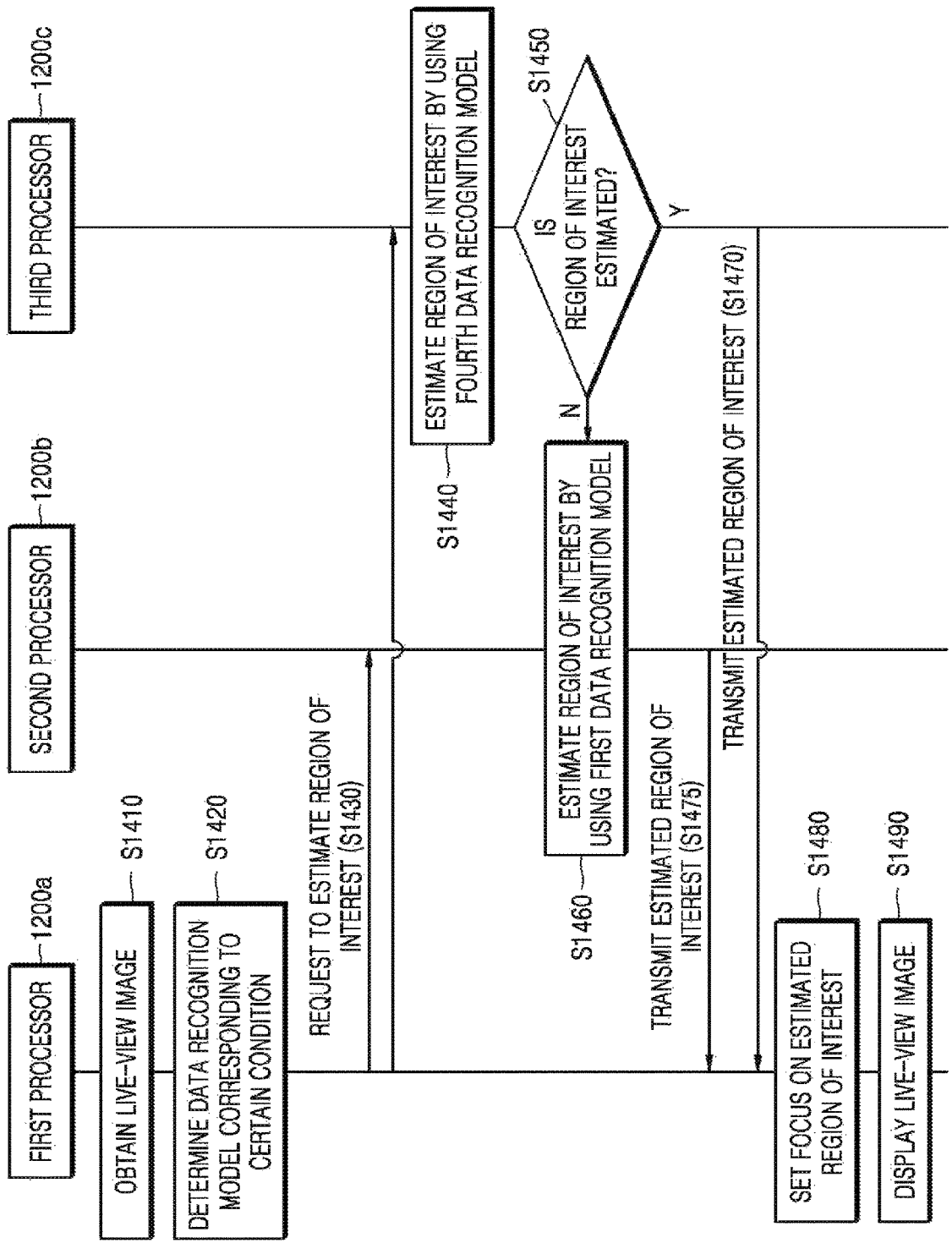
FIG. 14 is a flowchart for describing a case of estimating a region of interest when an image processing apparatus includes a first processor, a second processor, and a third processor according to an embodiment of the present disclosure.

FIG. 14 is a flowchart for describing a case of estimating a region of interest when an image processing apparatus includes a first processor, a second processor, and a third processor according to an embodiment of the present disclosure.

Referring to FIG. 14, the image processing apparatus 1000 may include the first processor 1200a, the second processor 1200b, and a third processor 1200c. For example, the second processor 1200b may estimate a region of interest by using a first data recognition model. The third processor 1200c may estimate a region of interest by using a second data recognition model or a fourth data recognition model.

In operation S1410, the first processor 1200a may obtain a live-view image. A live-view image may include at least one object, for example.

In operation S1420, the first processor 1200a may determine a data recognition model corresponding to a certain condition.

For example, the first processor 1200a may determine to use a second data recognition model or a fourth data recognition model when the image processing apparatus 1000 satisfies the second condition described above with reference to FIG. FIG. 3.

According to an embodiment, the first processor 1200a may set the fourth data recognition model as a default data recognition model corresponding to the second condition to speed up detection of a region of interest to a user. However, the present disclosure is not limited thereto. For example, the first processor 1200a may select either the second data recognition model or the fourth data recognition model depending on a default value set by a manufacturer of the image processing apparatus 1000 or a user selection.

Furthermore, when the image processing apparatus 1000 does not satisfy the second condition, the first processor 1200a may determine that the first condition is satisfied and determine to use the first data recognition model.

In operation S1430, when it is determined to use the first data recognition model, the first processor 1200a may request the second processor 1200b to estimate a region of interest. Furthermore, when it is determined to use the second data recognition model or the fourth data recognition model, the first processor 1200a may request the third processor 1200c to estimate a region of interest.

In operation S1440, the third processor 1200c may estimate a region of interest by using the fourth data recognition model.

In operation S1450, the third processor 1200c may check whether estimation of a region of interest is completed by using the fourth data recognition model.

In operation S1470, when it is checked that a region of interest is estimated by using the fourth data recognition model, the third processor 1200c may transmit the estimated region of interest to the first processor 1200a.

In operation S1460, the second processor 1200b may estimate a region of interest by using the first data recognition model. Furthermore, when it is determined in operation S1450 that the third processor 1200c failed to estimate a region of interest by using the fourth data recognition model, the second processor 1200b may estimate a region of interest by using the first data recognition model.

In operation S1475, the second processor 1200b may transmit the region of interest estimated by using the first data recognition model to the first processor 1200a.

In operation S1480, the first processor 1200a may set a focus on the estimated region of interest.

In operation S1490, the first processor 1200a may display a live-view image in which a focus is set on the estimated region of interest.

Figure 15:
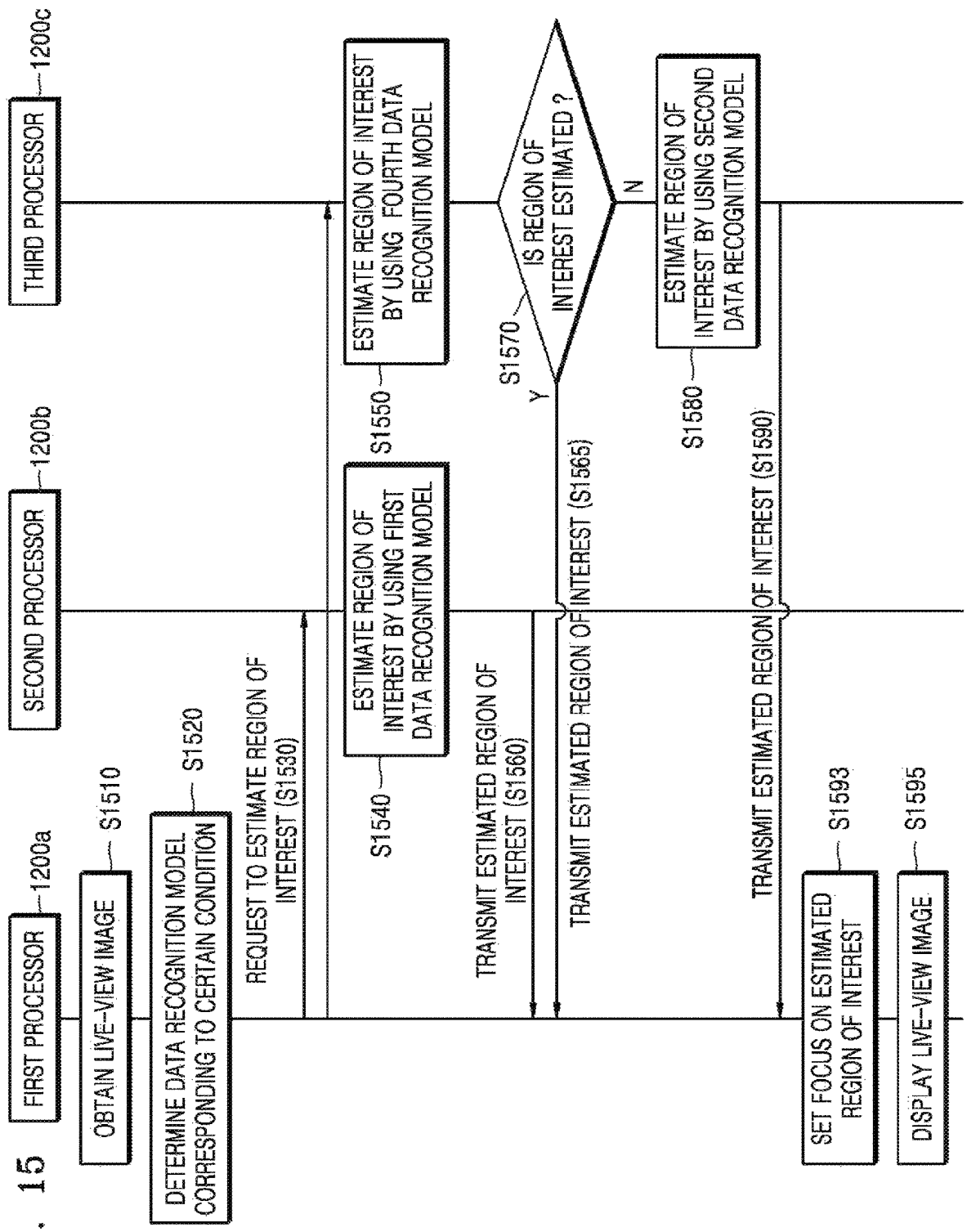
FIG. 15 is a flowchart for describing a case of estimating a region of interest when an image processing apparatus includes a first processor, a second processor, and a third processor according to an embodiment of the present disclosure.

FIG. 15 is a flowchart for describing another case of estimating a region of interest when an image processing apparatus includes a first processor, a second processor, and a third processor according to an embodiment of the present disclosure.

Referring to FIG. 15, in operation S1510, the first processor 1200a may obtain a live-view image. A live-view image may include at least one object, for example.

In operation S1520, the first processor 1200a may determine a data recognition model corresponding to a certain condition.

For example, the first processor 1200a may determine to use a second data recognition model or a fourth data recognition model when the image processing apparatus 1000 satisfies the second condition described above with reference to FIG. FIG. 3.

According to an embodiment, the first processor 1200a may set the fourth data recognition model as a default data recognition model corresponding to the second condition to speed up detection of a region of interest to a user. However, the present disclosure is not limited thereto. For example, the first processor 1200a may select either the second data recognition model or the fourth data recognition model depending on a default value set by a manufacturer of the image processing apparatus 1000 or a user selection.

Furthermore, when the image processing apparatus 1000 does not satisfy the second condition, the first processor 1200a may determine that the first condition is satisfied and determine to use the first data recognition model.

In operation S1530, when it is determined to use the first data recognition model, the first processor 1200a may request the second processor 1200b to estimate a region of interest. Furthermore, when it is determined to use the second data recognition model or the fourth data recognition model, the first processor 1200a may request the third processor 1200c to estimate a region of interest.

In operation S1540, the second processor 1200b may estimate a region of interest by using the first data recognition model.

In operation S1560, the second processor 1200b may transmit the estimated region of interest to the first processor 1200a.

In operation S1550, the third processor 1200c may estimate a region of interest by using the fourth data recognition model.

In operation S1570, the third processor 1200c may check whether estimation of a region of interest is completed by using the fourth data recognition model.

In operation S1565, when it is checked that a region of interest is estimated by using the fourth data recognition model, the third processor 1200*c* may transmit the estimated region of interest to the first processor 1200*a*.

In operation S1580, when it is determined that the third processor 1200*c* failed to estimate a region of interest by using the fourth data recognition model, the third processor 1200*c* may estimate a region of interest by using the second data recognition model.

For example, the fourth data recognition model may estimate a shape similar to an automobile as a region of interest. However, when objects detected in a live-view image does not have a shape similar to an automobile, the third processor 1200*c* may apply the second data recognition model and estimate another object customized to a user as a region of interest.

In operation S1590, the second processor 1200*b* may transmit the region of interest estimated by using the first data recognition model to the first processor 1200*a*.

In operation S1593, the first processor 1200*a* may set a focus on the estimated region of interest.

In operation S1595, the first processor 1200*a* may display a live-view image in which a focus is set on the estimated region of interest.

FIG. 16 is a flowchart for describing a case where an image processing apparatus estimates a region of interest by using a server according to an embodiment of the present disclosure.

Referring to FIG. 16, in this case, an interface for transceiving data between the image processing apparatus 1000 and the external server 2000 may be defined.

For example, an API having learning data to be applied to a data recognition model as an parameter (or an intermediate value or a transfer value) may be defined. An API may be defined as a set of subroutines or functions that may be invoked by any one protocol (e.g., a protocol defined in the image processing apparatus 1000) for a certain processing of another protocol (e.g., a protocol defined in the external server 2000). In other words, an environment in which an operation of another protocol may be performed by any one protocol through an API may be provided.

According to an embodiment, the external server 2000 may include a third data recognition model.

In operation S1610, the first processor 1200*a* may obtain a live-view image. A live-view image may include at least one object, for example.

In operation S1620, the first processor 1200*a* may determine a data recognition model corresponding to a certain condition.

For example, the image processing apparatus 1000 may determine to use the second data recognition model or the fourth data recognition model when the second condition described above with reference to FIG. 3 is satisfied. Furthermore, when the second condition is not satisfied, the image processing apparatus 1000 may determine that the first condition is satisfied and determine to use the first data recognition model.

In operation S1630, the image processing apparatus 1000 may check whether a region of interest is estimated by using a data recognition model.

In operation S1640, when a region of interest is estimated by using a data recognition model included in the image processing apparatus 1000, the image processing apparatus 1000 may set a focus on the estimated region of interest.

In operation S1650, when no region of interest is estimated by using a data recognition model included in the image processing apparatus 1000, the image processing apparatus 1000 may request the external server 2000 to estimate a region of interest.

In operation S1660, the external server 2000 may estimate a region of interest by using the third data recognition model.

In operation S1670, the external server 2000 may transmit the estimated region of interest to the image processing apparatus 1000.

In operation S1680, the image processing apparatus 1000 may set a focus on the estimated region of interest.

In operation S1690, the image processing apparatus 1000 may display a live-view image in which a focus is set on the estimated region of interest.

Meanwhile, the above-described image processing method may be implemented may be created as a program that may be executed by a computer and may be implemented on a general-purpose digital computer that operates such a program by using a computer-readable storage medium. Such computer-readable storage media may include ROMs, RAMs, flash memories, compact disk ROMs (CD-ROMs), CD-Rs, CD+Rs, CD-RWs, CD+RWs, digital versatile disk ROMs (DVD-ROMs), DVD-Rs, DVD+Rs, DVD-RWs, DVD+RWs, DVD-RAMs, BD-ROMs, BD-Rs, BD-R LTHs, BD-REs, magnetic tapes, floppy disks, optomagnetic data storage devices, optical data storage devices, hard disks, solid-state disks (SSD), and any types of devices capable of storing instructions or software, associated data, data files, and data structures and providing instructions or software, associated data, data files, and data structures to a processor or a computer, such that the processor or the computer may execute an instruction.

Also, the disclosed embodiments may be implemented as a software program including instructions stored on a computer-readable storage medium.

A computer may include an image processing apparatus according to the disclosed embodiments, which is an apparatus capable of invoking stored instructions from a storage medium and performing operations according to the disclosed embodiments, according to the invoked instructions.

A computer-readable storage medium may be provided in the form of a non-transitory storage medium. Here, 'non-transitory' merely means that a storage medium does not include a signal and is tangible and does not indicate whether data is stored semi-permanently or temporarily on the storage medium.

Also, a control method according to the disclosed embodiments may be provided in a computer program product. A computer program product may be traded between a seller and a purchaser as a commodity.

A computer program product may include a software program and a computer-readable storage medium having stored thereon the software program. For example, a computer program product may include a product in the form of a software program (e.g., a downloadable application) that is electronically distributed by a manufacturer of an image processing apparatus or through an electronic marketplace (e.g., Google Play Store, App Store, etc.). For electronic distribution, at least a portion of a software program may be stored on a storage medium or may be generated temporarily. In this case, the storage medium may be a server of a manufacturer, a server of an electronic marketplace, or a storage medium of a relay server for temporarily storing the software program.

The computer program product may include a storage medium of a server or a storage medium of an image processing apparatus, in a system including the server and the image processing apparatus. Alternatively, when there is a third device (e.g., a smart phone) communicating with the server or the image processing apparatus, the computer program product may include a storage medium of the third device. Alternatively, the computer program product may include a software program itself, which is transmitted from the server to the image processing apparatus or the third device or transmitted from the third device to the image processing apparatus.

In this case, one of the server, the image processing apparatus, and the third device may execute the computer program product to perform the method according to the disclosed embodiments. Alternatively, two or more of the server, the image processing apparatus, and the third device may execute the computer program product to execute the method according to the disclosed embodiments in distributed fashion.

For example, a server (e.g., a cloud server or AI server, etc.) may execute a computer program product stored in the server to control an image processing apparatus communicating with the server to perform the method according to the disclosed embodiments.

In another example, a third device may execute a computer program product to control an image processing apparatus communicating with the third device to perform the method according to the disclosed embodiments. When the third device executes a computer program product, the third device may download the computer program product from a server and execute the downloaded computer program product. Alternatively, the third device may execute a computer program product provided in a preloaded manner to perform the method according to the disclosed embodiments.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image processing apparatus comprising:
   a communication interface;
   a display;
   a camera;
   a memory configured to store computer-executable instructions; and
   at least one processor, which, by executing the computer-executable instructions, is configured to:
   obtain an image including at least one object via the camera,
   select a data recognition model corresponding to a certain condition from among a plurality of data recognition models that are differently trained to estimate a region of interest including a salient region within the obtained image using training image data, the plurality of data recognition models comprising a first data recognition model being trained for estimating the region of interest based on information related to an object and a second data recognition model being trained for estimating the region of interest based on interest information of a user,
   based on the selected data recognition model corresponding to the certain condition, estimate the region of interest within the obtained image according to criteria for the selected data recognition model to determine whether a region corresponds to learned information of interest,
   the estimated region of interest including an estimate of a first region in the obtained image as the region of interest by applying the obtained image to the first data recognition model, based on the certain condition satisfying a first condition, and
   the estimated region of interest including an estimate of a second region in the obtained image as the region of interest by applying the obtained image to the second data recognition model, based on the certain condition satisfying a second condition, and
   control the display to display the image in which the region of interest is estimated.

2. The image processing apparatus of claim 1, wherein the salient region is determined according to certain criteria regarding areas occupied by objects in an image or color distribution of the image.

3. The image processing apparatus of claim 1, wherein the image includes a live-view image obtained by the camera.

4. The image processing apparatus of claim 3, wherein the at least one processor is further configured to:
   set a focus on the estimated region of interest, and
   display the live-view image in which the focus is set on the estimated region of the interest.

5. The image processing apparatus of claim 4, wherein, when a plurality of regions of interest are estimated, the at least one processor is further configured to perform multi-focusing for setting focuses on all of the plurality of regions of interest.

6. The image processing apparatus of claim 4, wherein, when a plurality of regions of interest are estimated, the at least one processor is further configured to set a focus on the region of interest selected by the user from among the plurality of regions of interest.

7. The image processing apparatus of claim 1, wherein, in response to an image capture command from the user, the at least one processor is further configured to control the camera to capture an image with a focus set on the estimated region of interest.

8. The image processing apparatus of claim 1, wherein the first region estimated by the first data recognition model as the region of interest is different from the second region estimated by the second data recognition model as the region of interest.

9. An image processing method comprising:
   obtaining an image including at least one object;
   selecting a data recognition model corresponding to a certain condition, from among a plurality of data recognition models that are differently trained to estimate a region of interest including a salient region within the obtained image using training image data, the plurality of data recognition models comprising a first data recognition model being trained for estimating the region of interest based on information related to an object and a second data recognition model being trained for estimating the region of interest based on interest information of a user;
   based on the selected data recognition model corresponding to the certain condition, estimating the region of interest within the obtained image according to criteria for the selected data recognition model to determine whether a region corresponds to learned information of interest, the estimated region of interest including an estimate of a first region in the obtained image as the region of interest by applying the obtained image to the first data recognition model, based on a determination the certain condition satisfying a first condition, and the estimated region of interest including an estimate of a second region in the obtained image as the region of interest by applying the obtained image to the second data recognition model, based on the certain condition satisfying a second condition; and displaying the image in which the region of interest is estimated.

10. The image processing method of claim 9, wherein the salient region is determined according to certain criteria regarding areas occupied by objects in an image or color distribution of the image.

11. The image processing method of claim 9, wherein the image includes a live-view image.

12. The image processing method of claim 11, further comprising:

setting a focus on the estimated region of interest; and
displaying the live-view image in which the focus is set on the estimated region of the interest.

13. The image processing method of claim 12, wherein the setting of the focus, when a plurality of regions of interest are estimated, comprises setting focuses on all of the plurality of regions of interest by performing multi-focusing.

14. The image processing method of claim 12, wherein the setting of the focus, when a plurality of regions of interest are estimated, comprises setting a focus on the region of interest selected by the user from among the plurality of regions of interest.

15. A computer program product comprising a non-transitory recording medium having stored thereon instructions defined to perform by at least one processor an imaging processing method comprising:

obtaining an image including at least one object;

selecting a data recognition model corresponding to a certain condition, from among a plurality of data recognition models that are differently trained to estimate a region of interest in including a salient region within training image data, the plurality of data recognition models comprising a first data recognition model being trained for estimating the region of interest based on information related to an object and a second data recognition model being trained for estimating the region of interest based on interest information of a user;

based on the selected data recognition model corresponding to the certain condition, estimating the region of interest in the obtained image according to criteria for the selected data recognition model to determine whether a region corresponds to learned information of interest, the estimated region of interest including an estimate of a first region in the obtained image as the region of interest by applying the obtained image to the first data recognition model, based on the certain condition satisfying a first condition, and the estimated region of interest including an estimate of a second region in the obtained image as the region of interest by applying the obtained image to the second data recognition model, based on the certain condition satisfying a second condition; and displaying the image in which the region of interest is estimated.

* * * * *